US012034977B2

(12) United States Patent
Lim et al.

(10) Patent No.: US 12,034,977 B2
(45) Date of Patent: Jul. 9, 2024

(54) VIDEO ENCODING/DECODING METHOD AND DEVICE, AND RECORDING MEDIUM FOR STORING BITSTREAM

(71) Applicants: Electronics and Telecommunications Research Institute, Daejeon (KR); CHIPS & MEDIA, INC, Seoul (KR); INDUSTRY ACADEMY COOPERATION FOUNDATION OF SEJONG UNIVERSITY, Seoul (KR); INDUSTRY-UNIVERSITY COOPERATION FOUNDATION KOREA AEROSPACE UNIVERSITY, Goyang-si (KR)

(72) Inventors: Sung Chang Lim, Daejeon (KR); Jung Won Kang, Daejeon (KR); Ha Hyun Lee, Seoul (KR); Jin Ho Lee, Daejeon (KR); Hui Yong Kim, Daejeon (KR); Dae Yeon Kim, Seoul (KR); Wook Je Jeong, Gwacheon-si (KR); Dong Jin Park, Seoul (KR); Min Yong Jeon, Seoul (KR); Yung Lyul Lee, Seoul (KR); Nam Uk Kim, Seoul (KR); Myung Jun Kim, Seoul (KR); Ji Youn Jung, Seoul (KR); Jae Gon Kim, Goyang-si (KR)

(73) Assignees: ELECTRONICS AND TELECOMMUNICATIONS RESEARCH INSTITUTE, Daejeon (KR); CHIPS & MEDIA, INC, Seoul (KR); INDUSTRY ACADEMY COOPERATION FOUNDATION OF SEJONG UNIVERSITY, Seoul (KR); INDUSTRY-UNIVERSITY COOPERATION FOUNDATION KOREA AEROSPACE UNIVERSITY, Goyang-si (KR)

( * ) Notice: Subject to any disclaimer, the term of this patent is extended or adjusted under 35 U.S.C. 154(b) by 0 days.

(21) Appl. No.: 17/256,165
(22) PCT Filed: Jun. 28, 2019
(86) PCT No.: PCT/KR2019/007923
§ 371 (c)(1),
(2) Date: Dec. 24, 2020
(87) PCT Pub. No.: WO2020/005031
PCT Pub. Date: Jan. 2, 2020

(65) Prior Publication Data
US 2021/0274223 A1    Sep. 2, 2021

(30) Foreign Application Priority Data

Jun. 28, 2018   (KR) ................. 10-2018-0074915
Mar. 11, 2019   (KR) ................. 10-2019-0027762

(51) Int. Cl.
H04N 19/82     (2014.01)
H04N 19/107    (2014.01)
H04N 19/176    (2014.01)

(52) U.S. Cl.
CPC .......... *H04N 19/82* (2014.11); *H04N 19/107* (2014.11); *H04N 19/176* (2014.11)

(58) Field of Classification Search
CPC ...... H04N 19/117; H04N 19/70; H04N 19/82; H04N 19/119; H04N 19/80; H04N 19/86; H04N 19/105; H04N 19/159
See application file for complete search history.

(56) References Cited

U.S. PATENT DOCUMENTS

| 9,565,436 B2* | 2/2017 | Norkin ................. H04N 19/46 |
| 2009/0080517 A1* | 3/2009 | Ko .......................... H04N 19/61 375/240.03 |

(Continued)

FOREIGN PATENT DOCUMENTS

| KR | 100772576 B1 | 11/2007 |
| KR | 1020180006411 A | 1/2018 |

(Continued)

OTHER PUBLICATIONS

Marzuki et al., "Modified Deblocking Filtering Process for Intra Block Copy (IBC)," Joint Collaborative Team on Video Coding (JCT-VC) of ITU-T SG16 WP3 and ISO/IEC JTC1/SC29/WG11, Sapporo, Document JCTVC-R0118, Jun. 30-Jul. 9, 2014, 5 pages (Year: 2014).*

*Primary Examiner* — Daniel Chang
(74) *Attorney, Agent, or Firm* — Sughrue Mion, PLLC

(57) ABSTRACT

An image decoding is performed by steps including: determining whether or not to perform filtering on a boundary of a current block; determining a filtering strength on the boundary of the current block, and a number of samples used in filtering; and performing filtering on the boundary of the current block on the basis of the filtering strength and thenumber of samples used in filtering, where the number of samples used in filtering is determined on the basis of a size of the current block.

17 Claims, 19 Drawing Sheets

(56) References Cited

U.S. PATENT DOCUMENTS

| | | | |
|---|---|---|---|
| 2010/0260264 A1* | 10/2010 | Sun | H04N 19/197 375/E7.026 |
| 2011/0033120 A1* | 2/2011 | Sezaki | G09G 5/08 382/203 |
| 2011/0087859 A1* | 4/2011 | Mimar | G06F 9/30141 712/E9.016 |
| 2012/0230413 A1* | 9/2012 | Lou | H04N 19/117 375/E7.26 |
| 2012/0281762 A1* | 11/2012 | Dane | H04N 19/51 375/240.16 |
| 2013/0094773 A1* | 4/2013 | Misra | H04N 19/46 382/233 |
| 2013/0101025 A1* | 4/2013 | Van der Auwera | H04N 19/117 375/240.03 |
| 2013/0101031 A1* | 4/2013 | Van der Auwera | H04N 19/198 375/E7.193 |
| 2013/0114730 A1* | 5/2013 | Joshi | H04N 19/176 375/240.12 |
| 2013/0156096 A1* | 6/2013 | Yang | H04N 19/176 375/240.02 |
| 2014/0211848 A1* | 7/2014 | Hsu | H04N 19/50 375/240.02 |
| 2014/0226721 A1* | 8/2014 | Joshi | H04N 19/176 375/240.12 |
| 2014/0301465 A1* | 10/2014 | Kwon | H04N 19/109 375/240.16 |
| 2014/0376634 A1* | 12/2014 | Guo | H04N 19/154 375/240.16 |
| 2015/0245024 A1* | 8/2015 | Shin | H04N 19/176 375/240.29 |
| 2015/0256827 A1* | 9/2015 | Minezawa | H04N 19/139 375/240.03 |
| 2015/0271515 A1* | 9/2015 | Pang | H04N 19/70 375/240.16 |
| 2016/0037049 A1* | 2/2016 | Niida | H04N 23/661 348/211.3 |
| 2016/0044312 A1 | 2/2016 | Sato | |
| 2016/0100163 A1* | 4/2016 | Rapaka | H04N 19/182 375/240.16 |
| 2016/0105685 A1* | 4/2016 | Zou | H04N 19/176 375/240.12 |
| 2016/0241858 A1* | 8/2016 | Li | H04N 19/176 |
| 2016/0241868 A1* | 8/2016 | Li | H04N 19/52 |
| 2016/0330481 A1* | 11/2016 | Zhang | H04N 19/96 |
| 2017/0127090 A1* | 5/2017 | Rosewarne | H04N 19/159 |
| 2017/0237939 A1* | 8/2017 | Han | H04N 19/80 348/14.08 |
| 2017/0272758 A1* | 9/2017 | Lin | H04N 19/176 |
| 2017/0302966 A1* | 10/2017 | Xu | H04N 19/196 |
| 2018/0054613 A1* | 2/2018 | Lin | H04N 19/117 |
| 2018/0146215 A1* | 5/2018 | Kondo | H04N 19/46 |
| 2018/0176601 A1* | 6/2018 | Jeong | H04N 19/137 |
| 2019/0007684 A1* | 1/2019 | Van der Auwera | H04N 19/13 |
| 2019/0124359 A1* | 4/2019 | Yang | H04N 19/176 |
| 2019/0230353 A1* | 7/2019 | Gadde | H04N 19/176 |
| 2019/0297350 A1* | 9/2019 | Lin | H04N 19/176 |
| 2020/0221100 A1* | 7/2020 | Xu | H04N 19/117 |
| 2020/0296395 A1* | 9/2020 | Xu | H04N 19/156 |
| 2021/0006839 A1* | 1/2021 | Lu | H04N 19/82 |
| 2021/0120239 A1* | 4/2021 | Zhu | H04N 19/14 |

FOREIGN PATENT DOCUMENTS

| | | |
|---|---|---|
| KR | 20180032775 A * | 4/2018 |
| KR | 1020180032775 A | 4/2018 |
| KR | 1020180061273 A | 6/2018 |
| KR | 1020180070716 A | 6/2018 |
| WO | 2001086962 A1 | 11/2001 |
| WO | 2011013580 A1 | 2/2011 |
| WO | 2016200115 A1 | 12/2016 |
| WO | 2017054194 A1 | 4/2017 |

* cited by examiner

FIG. 8
(1)
filtering on vertical boundary
A: left block, B: current block
(2)
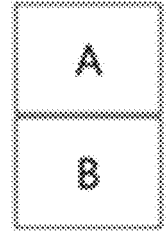
filtering on horizontal boundary
A: top block, B: current block

FIG. 21

| Picture Parameter Set (PPS) - syntax | Semantic |
|---|---|
| tiles_enabled_flag | |
| num_tiles_in_column | |
| num_tiles_in_row | |
| loop_filter_across_tile | whether or not to perform loop filtering on boundary of tiles within picture |
| if(tiles_enabled_flag && loop_filter_across_tile) | |
| { | |
|     for(i =0; i< num_tiles_in_column; i++) | whether or not to perform loop filtering on picture boundary of each tile and method thereof |
|     { | |
|         loop_filter_across_tile_col[i][0] | |
|         if(loop_filter_across_tile_col[i][0]) | |
|             loop_filter_across_tile_upper_boundary[i] | positional information on boundary continuous to i-th top picture boundary |
|     } | |
|     for(i =0; i< num_tiles_in_row; i++) | whether or not to perform loop filter on boundary continuous to left picture boundary of each tile |
|     { | |
|         loop_filter_across_tile_row[i][0] | |
|         if(loop_filter_across_tile_row[i][0]) | |
|             loop_filter_across_tile_left_boundary[i] | positional information on boundary continuous to i-th left picture boundary |
|     } | |
|     for(i =1; i< num_tiles_in_column; i++) | |
|         for(j=1; j< num_tiles_in_row; j++) | |
|         { | whether or not to perform loop filter on top boundary of each tile and method thereof |
|             loop_filter_across_tile_col[i][j] | |
|             loop_filter_across_tile_row[i][j] | whether or not to perform loop filter on left boundary of each tile and method thereof |
|         } | |
| } | |

VIDEO ENCODING/DECODING METHOD AND DEVICE, AND RECORDING MEDIUM FOR STORING BITSTREAM

TECHNICAL FIELD

The present invention relates to a method and apparatus for encoding/decoding an image, and a recording medium for storing a bitstream. More particularly, the present invention relates to a method and apparatus for encoding/decoding an image by using a motion-constrained tile set.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, a high-efficiency image encoding/decoding technique for an image with high-resolution and high image quality is required.

Image compression techniques include various techniques, such as an inter prediction technique of predicting a pixel value included in a current picture from the preceding or following picture of the current picture, an intra prediction technique of predicting a pixel value included in a current picture by using pixel information within the current picture, transform and quantization techniques for compressing the energy of a residual signal, an entropy encoding technique of assigning a short code to a value with a high appearance frequency and of assigning a long code to a value with a low appearance frequency, and the like. These image compression techniques are used to compress image data effectively for transmission or storage.

Conventional image encoding/decoding methods and apparatuses are limited in performing encoding/decoding as filtering methods used therein are limited in application.

DISCLOSURE

Technical Problem

The present invention aims to provide an image decoding/encoding method and apparatus for performing efficient deblocking filtering.

Technical Solution

A method of decoding an image according to the present invention, the method may comprise determining whether or not to perform filtering on a boundary of a current block, determining a filtering strength on the boundary of the current block, and a number of samples used in filtering and performing filtering on the boundary of the current block on the basis of the filtering strength and the number of samples used in filtering, wherein the number of samples used in filtering is determined on the basis of at least one of a size of the current block and a size of a neighboring block adjacent to the boundary of the current block.

In the method of decoding an image according to the present invention, wherein the number of samples used in filtering is determined on the basis of at least one of a width of the current block and a width of the neighboring block when the boundary of the current block is a vertical boundary.

In the method of decoding an image according to the present invention, wherein the number of samples used in filtering is determined on the basis of at least one of a height of the current block and a height of the neighboring block when the boundary of the current block is a horizontal boundary.

In the method of decoding an image according to the present invention, wherein the number of samples used in filtering is determined by comparing at least one of the size of the current block and the size of the neighboring block with a predefined value.

In the method of decoding an image according to the present invention, wherein the determining of whether or not to perform filtering is performed by whether or not the boundary of the current block matches with at least one of a picture boundary, a slice boundary, and a brick boundary.

In the method of decoding an image according to the present invention, wherein the filtering strength is determined on the basis of a prediction mode of the neighboring block and a prediction mode of the current block.

In the method of decoding an image according to the present invention, wherein the filtering strength is determined as a weak filtering strength when the prediction mode of the neighboring block and the prediction mode of the current block are different from each other.

In the method of decoding an image according to the present invention, wherein the number of samples used in filtering is independently determined according to a luma component and a chroma component of the current block.

A method of encoding an image according to the present invention, the method may comprise determining whether or not to perform filtering on a boundary of a current block, determining a filtering strength on the boundary of the current block, and a number of samples used in filtering, and performing filtering on the boundary of the current block on the basis of the filtering strength and the number of samples used in filtering, wherein the number of samples used in filtering is determined on the basis of at least one of a size of the current block and a size of a neighboring block adjacent to the current block.

In the method of encoding an image according to the present invention, wherein the number of samples used in filtering is determined on the basis of at least one of a width of the current block and a width of the neighboring block when the boundary of the current block is a vertical boundary.

In the method of encoding an image according to the present invention, wherein the number of samples used in filtering is determined on the basis of at least one of a height of the current block and a height of the neighboring block when the boundary of the current block is a horizontal boundary.

In the method of encoding an image according to the present invention, wherein the number of samples used in filtering is determined by comparing at least one of the size of the current block and the size of the neighboring block with a predefined value.

In the method of encoding an image according to the present invention, wherein the determining of whether or not to perform filtering is performed by whether or not the boundary of the current block matches with at least one of a picture boundary, a slice boundary, and a brick boundary.

In the method of encoding an image according to the present invention, wherein the filtering strength is determined on the basis of a prediction mode of the neighboring block and a prediction mode of the current block.

In the method of encoding an image according to the present invention, wherein the filtering strength is determined as a weak filtering strength when a prediction mode of the neighboring block and a prediction mode of the current block are different from each other.

In the method of encoding an image according to the present invention, wherein the number of samples used in filtering is independently determined according to a luma component and a chroma component of the current block.

A non-transitory computer readable storage medium according to the present invention, wherein the storage medium stores image data used for an image decoding method, wherein the image data includes information on whether or not to perform filtering, and in the image decoding method, the information on whether or not to perform filtering is used for determining whether or not to perform filtering on a boundary of a current block, wherein in the image decoding method, a filtering strength on the boundary of the current block and a number of samples used in filtering are determined, filtering on the boundary of the current block is performed on the basis of the filtering strength and the number of samples used in filtering, and the number of samples used in filtering is determined on the basis of at least one of a size of the current block and a size of the neighboring block adjacent to the current block.

Advantageous Effects

The present invention provides various filtering methods performed when encoding/decoding an image so as to improve image encoding/decoding efficiency.

The present invention can improve prediction efficiency by generating a prediction image by using a reference sample closer than an original image.

According to the present invention, image encoding/decoding efficiency can be improved.

According to the present invention, calculation complexity of the image encoder and decoder can be reduced.

DESCRIPTION OF DRAWINGS

FIG. 8 is a view showing filtering on a boundary of blocks adjacent with each other according to an embodiment of the present invention.

FIG. 21 is a view showing an example where syntax and semantics which are related to whether nor not to perform filtering on each boundary, and a transmission method are defined in a PPS.

MODE FOR INVENTION

Figure 1:
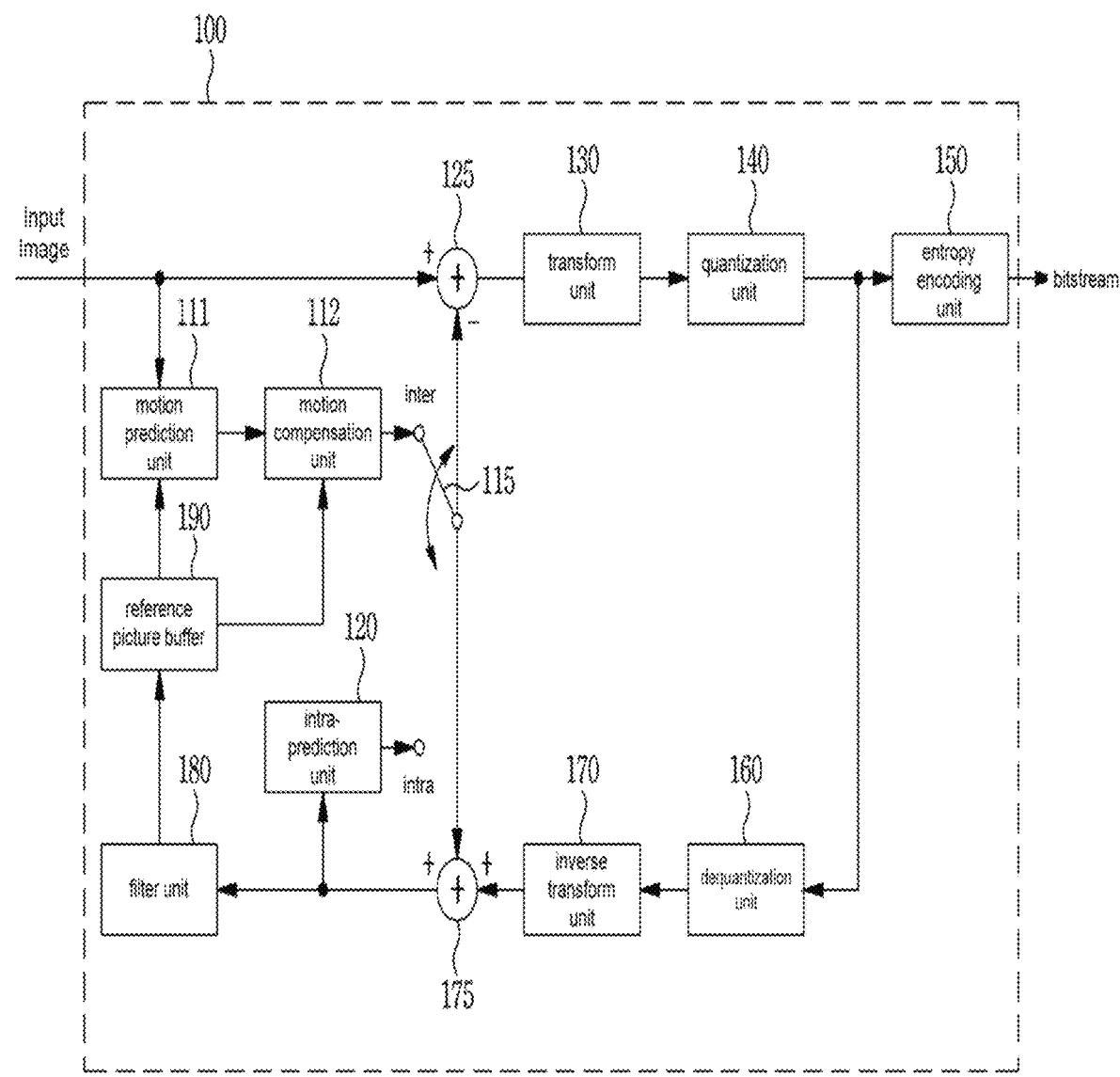
FIG. 1 is a view of a block diagram showing a configuration of an encoding apparatus to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

DESCRIPTION OF TERMS

Encoder: means an apparatus performing encoding. That is, means an encoding apparatus.

Decoder: means an apparatus performing decoding. That is, means an decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd-1}$ according to a bit depth ($B_d$). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quaternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

An adaptation parameter set may mean a parameter set that may be used and shared among pictures, subpictures, slices, tile groups, tiles, or bricks different from each other. In addition, in a subpicture, a slice, a tile group, a tile, or in a brick within a picture, information within an adaptation parameter set may be used by referring to adaptation parameter sets different from each other.

In addition, in a subpicture, a slice, a tile group, a tile, or in a brick within a picture, for an adaptation parameter set, adaptation parameter sets different from each other may be referred to by using identifiers of adaptation parameter sets different from each other.

In addition, in a slice, a tile group, a tile, or in a brick within a subpicture, for an adaptation parameter set, adaptation parameter sets different from each other may be referred to by using identifiers of adaptation parameter sets different from each other.

In addition, in a tile or a in a brick within a slice, for an adaptation parameter set, adaptation parameter sets different from each other may be referred to by using identifiers of adaptation parameter sets different from each other.

In addition, in a brick within a tile, for an adaptation parameter set, adaptation parameter sets different from each other may be referred to by using identifiers of adaptation parameter sets different from each other.

By including information on an adaptation parameter set identifier in a parameter set or header of the subpicture, an adaptation parameter set in association with the corresponding adaptation parameter set identifier may be used in the subpicture.

By including information on an adaptation parameter set identifier in a parameter set or header of the tile, an adaptation parameter set in association with the corresponding adaptation parameter set identifier may be used in the tile.

By including information on an adaptation parameter set identifier in a header of a brick, an adaptation parameter set in association with the corresponding adaptation parameter set identifier may be used in the brick.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture in a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, a inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode(intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an inter-polation filter coefficient, a motion vector size, a presentation accuracy of a motion vector, a transform type, a transform size, information of whether or not a primary(first) transform is used, information of whether or not a secondary transform is used, a primary transform index, a secondary transform index, information of whether or not a residual signal is present, a coded block pattern, a coded block flag(CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
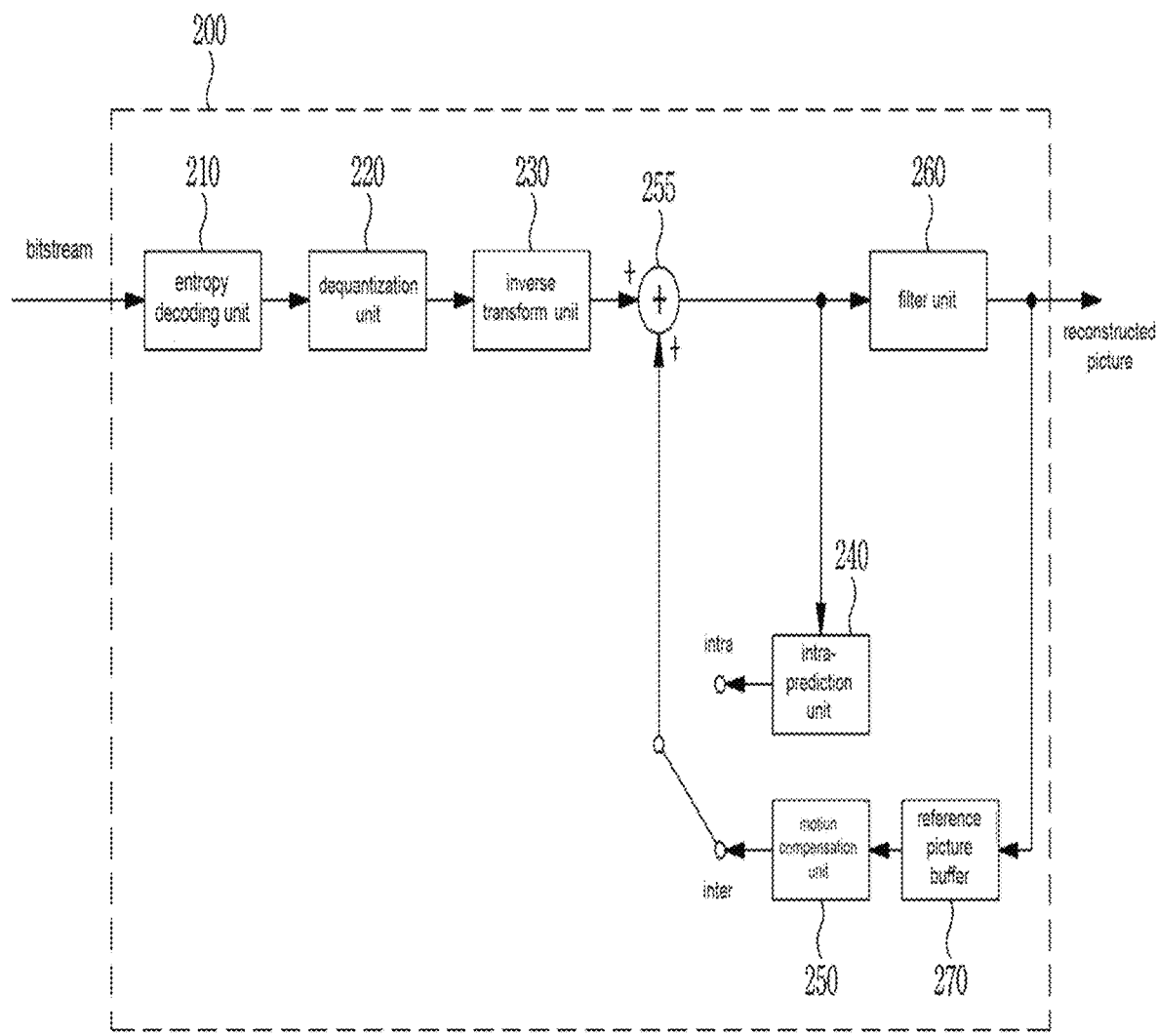
FIG. 2 is a view of a block diagram showing a configuration of a decoding apparatus to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, a inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be a inverse-process of the entropy encoding method described above.

In order to decode a transform coefficient level(quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
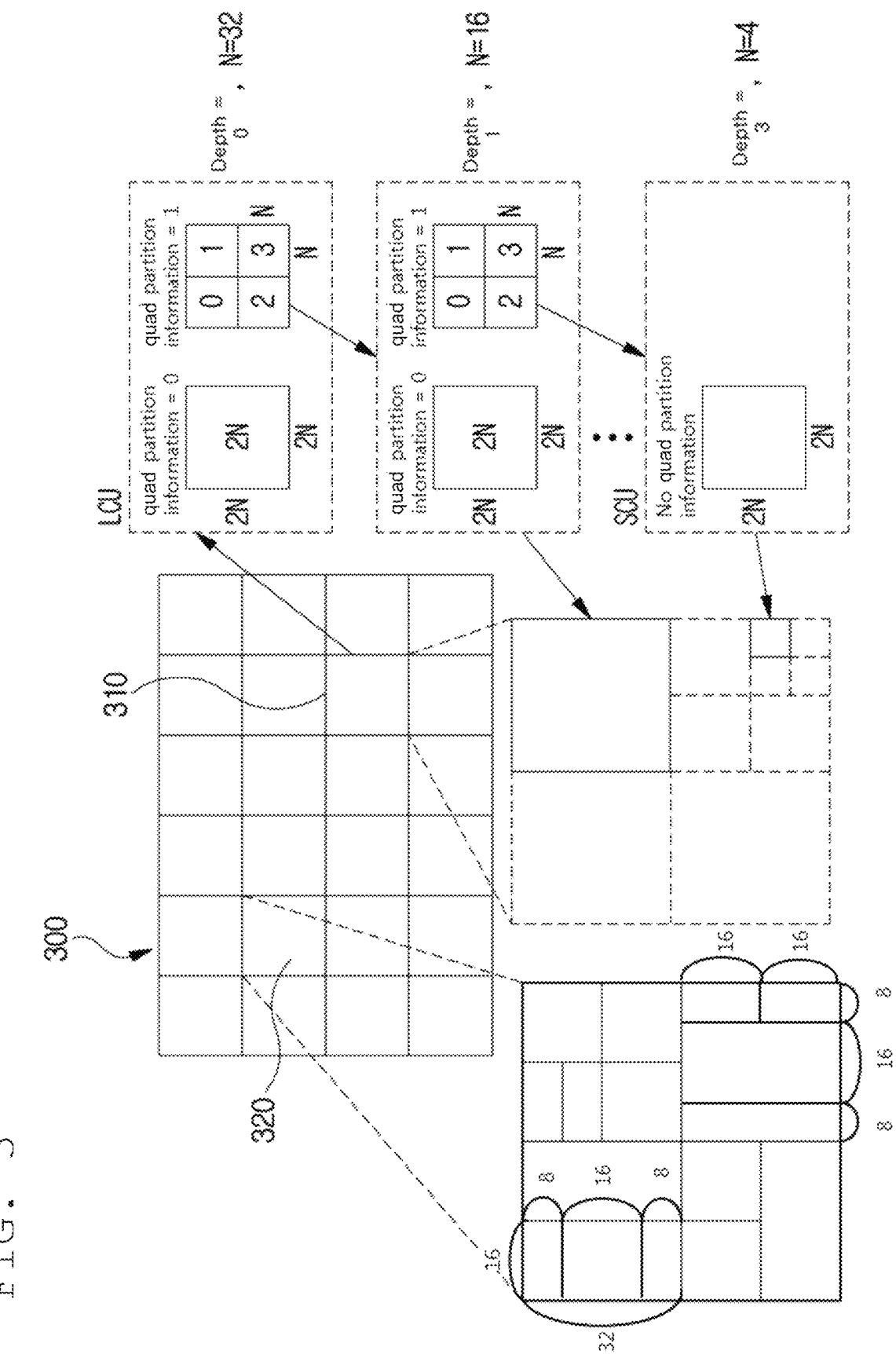
FIG. 3 is a view schematically showing a partition structure when encoding and decoding an image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

N×M (N and/or M is 128) Ternary tree partitioning for coding units

128×N (N<=64) Binary tree partitioning in horizontal direction for coding units

N×128 (N<=64) Binary tree partitioning in vertical direction for coding units

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
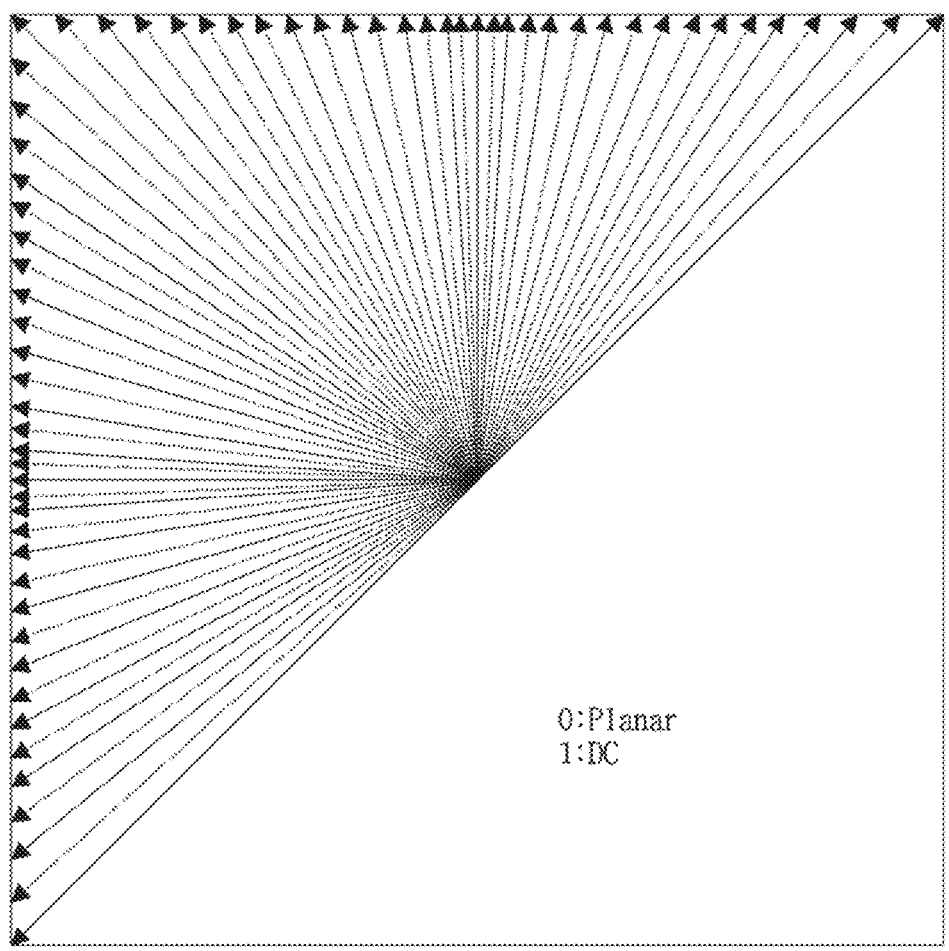
FIG. 4 is a view showing an example of intra-prediction.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
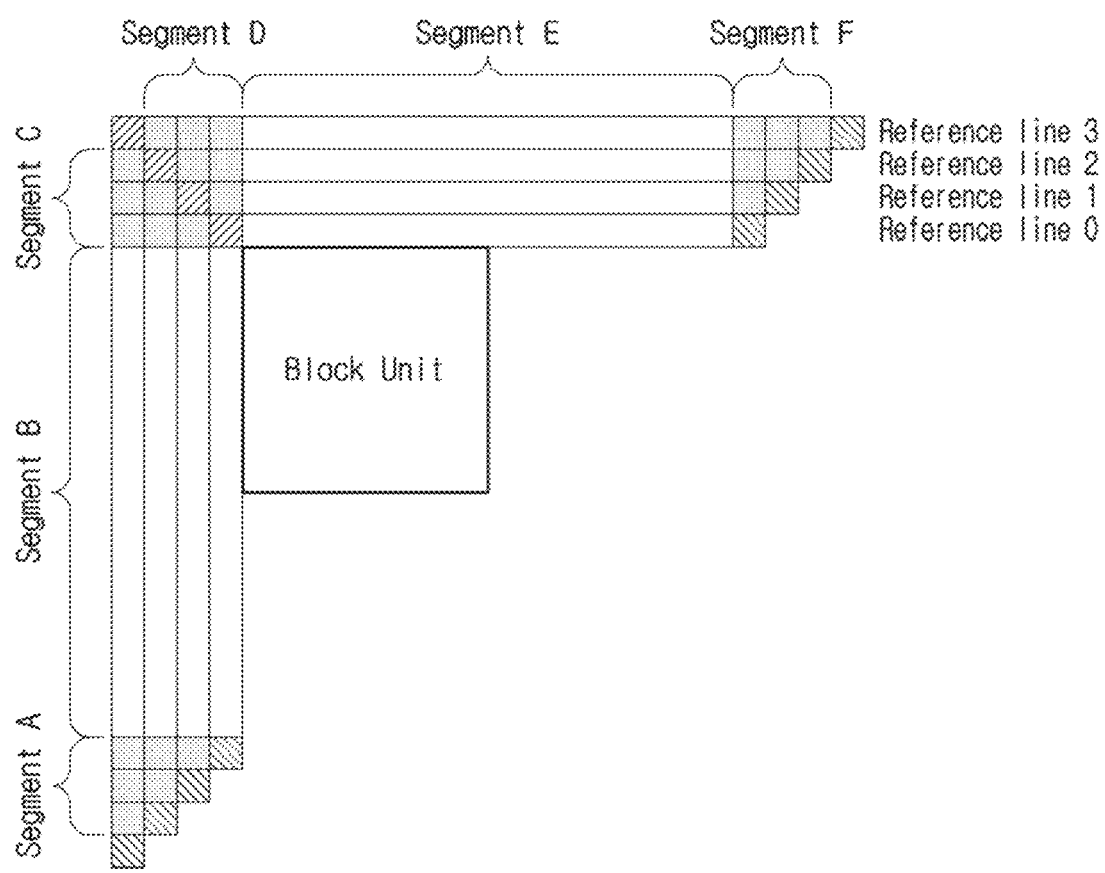
FIG. 7 is a view showing reference samples that are usable for intra-prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of a left upperside reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
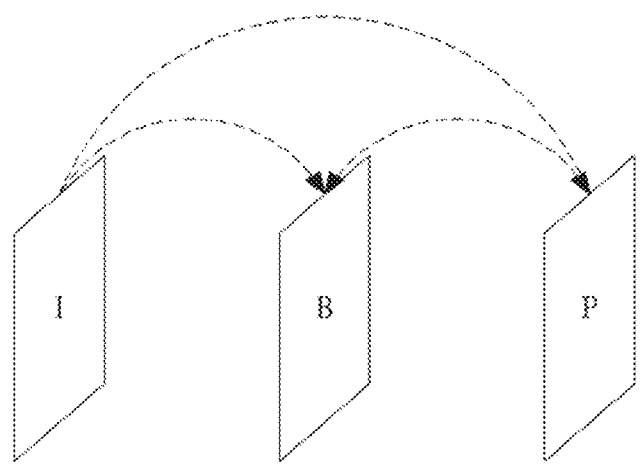
FIG. 5 is a view showing an example of inter-prediction.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a triangle partition mode, an inter-intra combination prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current block may be the merge mode. The merge mode may mean a method of merging motion information of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information existing in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control motion vector merge candidate.

The triangle partition mode may mean a mode that derives motion information by partitioning the current block into diagonal directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
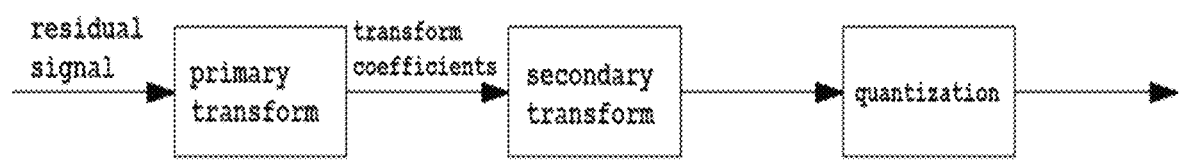
FIG. 6 is a view showing an example of transform and quantization.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loève transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

Hereinafter, a filter according to an embodiment of the present invention will be described.

In detail, filtering may be performed by determining whether or not to perform filtering on a block and a block boundary, a filtering boundary strength and a filtering method (or type). Herein, the filtering method may mean performing filtering by using filter lengths or filter coefficients different from each other. In addition, the filter may mean a deblocking filter. In addition, a block to which the filter is applied may mean at least one unit obtained by partitioning an image such as picture, subpicture, slice, tile, brick, coding tree unit, coding unit, prediction unit, transform unit, coding block, prediction block, transform block, subblock, etc. Herein, the subblock may be a unit obtained by additionally partitioning at least one of a coding unit, a prediction unit, and a transform unit such as Sub-CU, Sub-PU, Sub-TU, etc.

The picture may be partitioned into at least one row of tiles and at least one column of tiles.

The picture may be partitioned into at least one subpicture configured with at least one row of tiles and at least one column of tiles. The subpicture is a region having a square/non-square shape within the picture, and may include at least one CTU. In addition, at least one tile/brick/slice may be included within one subpicture.

The tile is a region having a square or non-square shape within the picture, and may include at least one CTU. In addition, the tile may be partitioned into at least one brick.

The brick may mean at least one row of CTUs within the tile. The tile may be partitioned into at least one brick, and each brick may include at least one row of CTUs. The tile that is not partitioned into at least two pieces may mean a brick.

The slice may include at least one tile within a picture, and at least one brick may be included within the tile.

A deblocking filter according to the present invention can reduce blocking artifacts occurring in a block boundary due to at least one of prediction, transform, and quantization.

Meanwhile, a filter according to the present invention may perform filtering by using information on at least one of prediction, transform, and quantization which is transmitted with a reconstructed current block. The information on at least one of prediction, transform, and quantization may be transferred to the adder by the dequantization and inverse transform module, and transferred to the filter again.

As described above, as a method of removing blocking artifacts, a deblocking filter is used, and the same may be applied in a loop filter form.

A deblocking filter may perform filtering on a block (M×N block, herein, M and N are positive integers) and a block boundary, or on a subblock within the block or a boundary of the subblock. A shape of MXN may mean a block shape of a square or non-square. Blocking artifacts occurs by performing prediction, transform, or quantization on a per block basis. In order to remove such blocking artifacts, a deblocking filter may be applied to a boundary of at least one unit of a CU, a PU, and a TU.

Meanwhile, a filtering method for removing blocking artifacts may perform filtering according to a block size taking into account all boundaries of M×N blocks.

Deblocking filtering according to the present invention may be performed as below.

First, in units of picture, subpicture, slice, tile, brick, CTU, or in a vertical boundary of a block, 1D horizontal directional filtering may be performed on reconstructed signals around the boundary. Subsequently, in units of picture, subpicture, slice, tile, brick, CTU, or in a horizontal boundary of a block, 1D vertical directional filtering may be performed on filtered reconstructed signals around the boundary.

Alternatively, first, in units of picture, subpicture, slice, tile, brick, CTU, or in a horizontal boundary of a block, 1D vertical directional filtering may be performed on reconstructed signals around the boundary. Subsequently, in units of picture, subpicture, slice, tile, brick, CTU, or in a vertical boundary of a block, 1D horizontal directional filtering may be performed on filtered reconstructed signals around the boundary.

A deblocking filtering method on a horizontal boundary may be similar to a deblocking filtering method on a vertical boundary. In the present invention, description is made on the basis of a deblocking filtering method on a vertical boundary, but a deblocking filtering method on a horizontal boundary may be performed or employed in a similar manner.

FIG. 8 is a view showing filtering on a boundary of blocks adjacent with each other according to an embodiment of the present invention.

Referring to FIG. 8, FIG. 8(1) shows an example of performing filtering on a vertical boundary of blocks adjacent with each other. In FIG. 8(1), horizontal directional filtering may be performed on a vertical boundary between a current block B and a left block A.

FIG. 8(2) shows an example of performing filtering on a horizontal boundary of blocks adjacent with each other. In FIG. 8(2), vertical directional filtering may be performed on a horizontal boundary between a current block B and a top block A.

Meanwhile, the block A and the block B of FIG. 8 may be at any one of a coding tree unit, a coding unit, a prediction unit, a transform unit, a coding tree block, a coding block, a prediction block, a transform block, or a child block (Sub-CU, Sub-TU, or Sub-PU).

Figure 9:
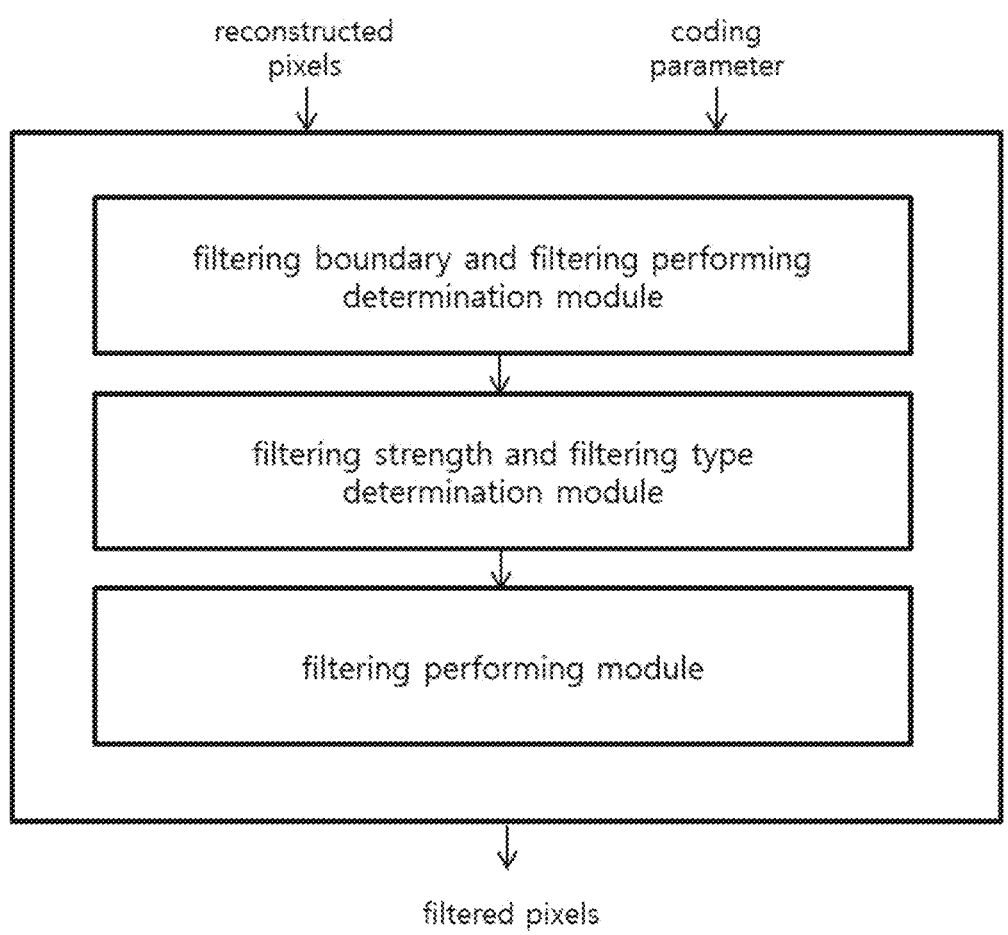
FIG. 9 is a view showing a deblocking filter according to the present invention.

FIG. 9 is a view showing a deblocking filter according to the present invention.

A least one coding parameter of a coding parameter of a filtering target block, and a coding parameter signaled through a header of a parent level, and reconstructed pixels used in filtering may be used as input for deblocking filtering. The coding parameter input to a deblocking filter of the present invention may mean a coding parameter described in FIG. 1.

A filtering boundary and whether or not to perform filtering may be determined by using information input for the deblocking filtering. Subsequently, a filtering strength on a boundary on which filtering is performed and a filtering type may be determined, and then deblocking filtering may be performed so as to output pixels on which filtering is performed.

Referring to FIG. 9, a deblocking filter according to an embodiment of the present invention may include: a filtering boundary and filtering performing determination module, a filtering strength and filtering type determination module, and a filtering performing module.

The filtering boundary and filtering performing determination module may determine whether a boundary on which deblocking filtering is performed is a block boundary, a tile boundary, a subpicture boundary, a brick boundary, or a slice boundary, and determine whether or not to perform filtering on the corresponding boundary.

The filtering strength and filtering type determination module may determine a filtering strength and a filtering type applied to a boundary where filtering is determined to be performed thereon. Herein, the filtering type may represent at least one of a number or position of samples used in filtering, a number of filtered samples, a position of the filtered sample, and a number of filtering taps.

Meanwhile, a tile is used for parallel processing, and thus performing filtering on a tile boundary may require additional post calculation. Accordingly, in addition to whether or not to perform filtering on a block boundary, information representing whether or not to perform filtering on a tile boundary is signaled through a parent level so as to selectively use filtering on the tile boundary. Filtering on a tile boundary will be described later. Herein, in place of the tile, boundary filtering that will be described later may be used on at least one of a picture, a subpicture, a slice, a brick, etc.

Figure 10:
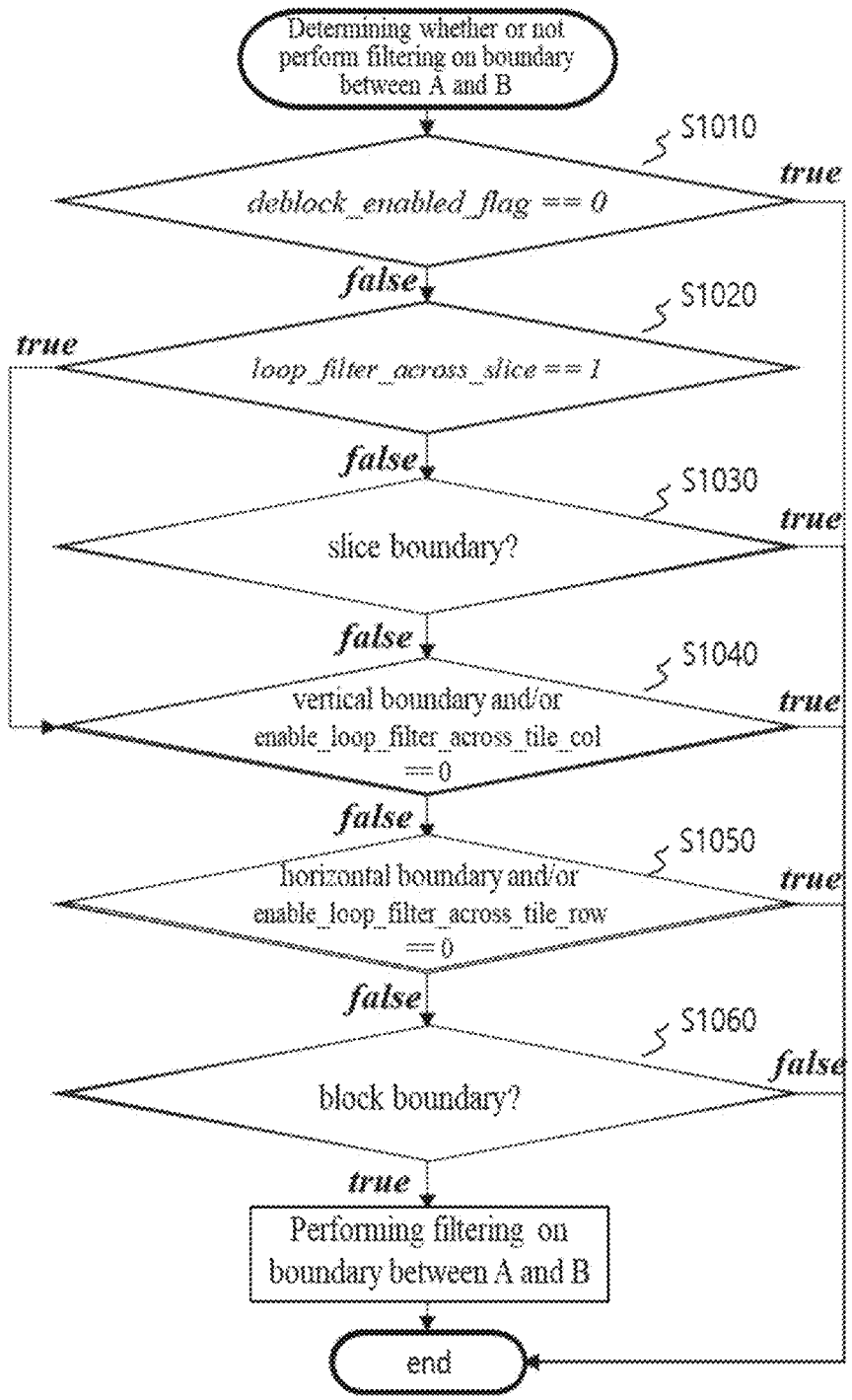
FIG. 10 is a view of a flowchart showing a method of determining whether or not to perform filtering according to an embodiment of the present invention.

FIG. 10 is a view of a flowchart showing a method of determining whether or not to perform filtering according to an embodiment of the present invention. In FIG. 10, a block A and a block B are blocks adjacent with each other, and may be the block A and the block B described in FIG. 8.

Referring to FIG. 10, when deblock_enabled_flag is 0, it is determined that performing filtering is not available, and thus filtering may be ended (S1010—true). On the contrary, when deblock_enabled_flag is 1, it is determined that performing filtering is available, and thus S1020 may be performed (S1010—false).

Herein, deblock_enabled_flag is information representing whether or not to performing a deblocking filter is available, and in case of 1, it may represent that performing deblocking filtering is available. On the contrary, in case of 0, it may represent that performing deblocking filtering is not available. deblock_enabled_flag may be signaled through a bitstream by being determined in units of sequence, picture, subpicture, slice, tile group, brick, or tile.

In an example described later, in place of a slice, at least one of a picture, a subpicture, a tile, a brick, etc. may be used.

In S1020, when loop_filter_across_slice is 1, it may be determined that filtering on a slice boundary is also available, and S1040 may be performed (S1020—true). On the contrary, when loop_filter_across_slice is 0, it may be determined that filtering on a slice boundary is not available, and S1030 may be performed (S1020—false).

Herein, loop_filter_across_slice is information representing whether or not performing a deblocking filter on a slice boundary is available. When a value of loop_filter_across_slice is 0, it may represent that performing deblocking filtering on a slice boundary is not available. When the value is 1, it may represent that performing deblocking filtering on a slice boundary is available. When a value of deblock_enabled_flag is 1, loop_filter_across_slice may be determined in units of sequence, picture, subpicture, slice, tile group, brick, or tile, and signaled through a bitstream.

In S1030, whether or not being a slice boundary may be determined, if so (S1030—true), filtering may be ended. In other words, when it is determined that performing filtering on a slice boundary is not available (loop_filter_across_slice==0), and the boundary is a slice boundary, filtering may be ended. On the contrary, when the boundary is not a slice boundary (S1030—false), S1040 may be performed.

In an example described later, in place of a tile, at least one of a picture, a subpicture, a slice, a brick, etc. may be used.

In S1040, when the boundary is a vertical boundary of a tile and enable_loop_filter_across_tile_col is 0, filtering may be ended (S1040—true). On the contrary, when the boundary is not a vertical boundary of a tile, or when enable_loop_filter_across_tile_col is 1, S1050 may be performed (S1040—false).

Herein, enable_loop_filter_across_tile_col is information representing whether or not to perform filtering on a left or right boundary of a current tile, and enable_loop_filter_across_tile_col may be derived from syntaxes on whether or not to perform filtering on a boundary of each tile which is transmitted through a header. When filtering that is currently performed is operations for a vertical boundary, whether or not to perform filtering may be determined by using the above information.

In S1050, when the boundary is a horizontal boundary of a tile and enable_loop_filter_across_tile_row is 0, filtering may be ended (S1050—true). On the contrary, when the boundary is not a horizontal boundary of a tile, or when enable_loop_filter_across_tile_row is 1, S1060 may be performed (S1050—false).

Herein, enable_loop_filter_across_tile_row is information representing whether or not to perform filtering on a top or bottom boundary of a current tile. enable_loop_filter_across_tile_row may be derived from syntaxes on whether or not to perform filtering on a boundary of each tile which is transmitted through a header. When filtering that is currently performed is operations for a horizontal boundary, whether or not to perform filtering may be determined by using the above information.

Meanwhile, when deblock_enabled_flag is 0, or a value of loop_filter_across_tile is 0, values of enable_loop_filter_across_tile_col and enable_loop_filter_across_tile_row may be derived to 0. When deblock_enabled_flag is 1, and a value of loop_filter_across_tile is 1, deriving may be performed by using a syntax on whether or not to perform filtering on a boundary of each tile which is transmitted through a header.

In S1060, whether or not being a block boundary is determined, and if so, filtering may be performed (S1060—true). On the contrary, if not, filtering may not be performed and may be ended (S1060—false). Herein, the block may mean a coding tree unit, a coding unit, a prediction unit, a transform unit, a coding tree block, a coding block, a prediction block, a transform block, and a subblock thereof.

In FIG. 10, it is determined that performing filtering on a slice boundary is not available (loop_filter_across_slice==0), and when the boundary is a slice boundary, filtering is not performed. The above may be applied to a boundary of a brick, a tile group, a coding tree unit, etc.

In an example, when it is determined that performing filtering on a brick boundary is not available (loop_filter_across_brick==0), and the boundary is a brick boundary, it may be determined that filtering is not performed.

In addition, when a boundary between blocks is a vertical boundary, and a left boundary of a current block matches with a boundary of a picture, it may be determined that filtering is not performed. In addition, when a boundary between blocks is a horizontal boundary, and a top boundary of a current block matches with a boundary of a picture, it may be determined that filtering is not performed.

Meanwhile, whether or not to perform filtering according to an embodiment of the present invention may be determined on the basis of a block size. Herein, the block size may be at least one of a width, a height, and an area of the block.

When a block size is M×N, and M or N is smaller than min_deblock_size that is a threshold value (Threshold), filtering may not be performed.

In an example, in case of a block of M×N (4×16), when min_deblock_size=8, filtering on a vertical boundary may not be performed.

Alternatively, in an example, in case of a block of M×N (16×4), when min_deblock_size=8, filtering on a horizontal boundary may not be performed.

Figure 11:
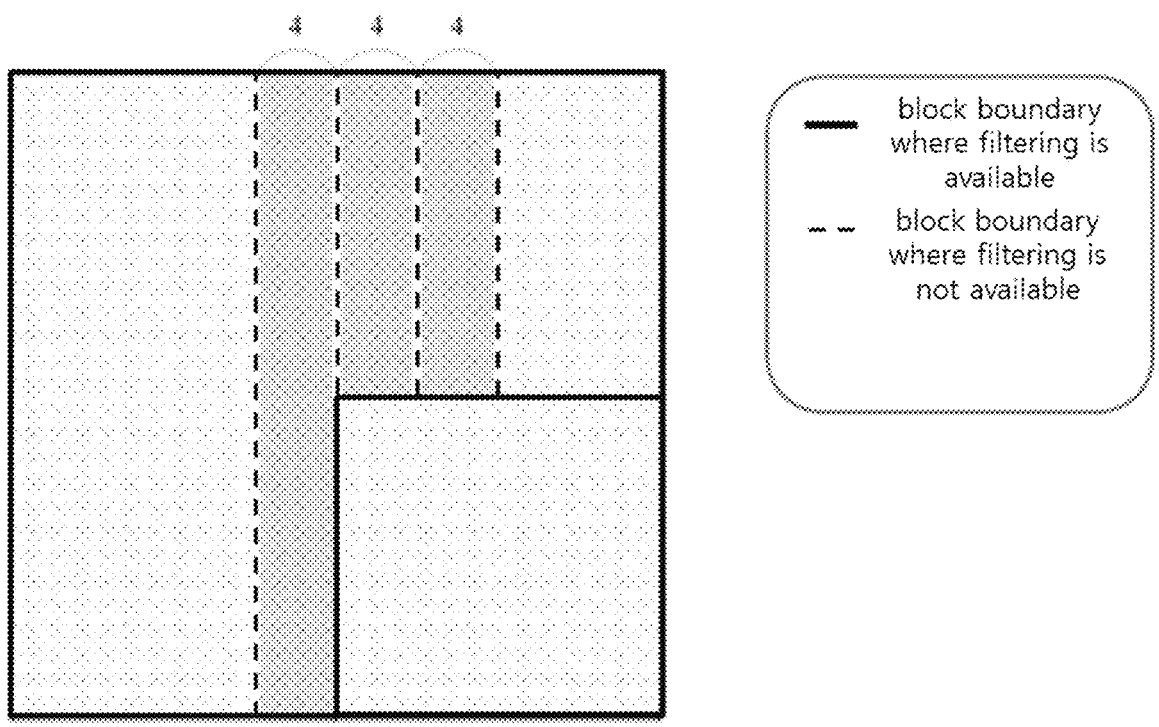
FIG. 11 is a view of an example where filtering is not performed on a boundary according to an embodiment of the present invention.

FIG. 11 is a view of an example of boundaries where filtering is not performed according to an embodiment of the present invention. In FIG. 11, it is assumed that min_deblock_size that is a threshold value (Threshold) is 8.

Referring to FIG. 11, filtering may not be performed on a vertical boundary of a (4×32) block and a (4×16) block.

Hereinafter, a method of determining a filtering strength according to an embodiment of the present invention will be described.

A filtering strength may be determined by taking into account at least one of a coding parameter of a block on which filtering is currently performed, a coding parameter of a neighboring block, and a block size.

In addition, a filtering strength may vary according to a value calculated by using at least one of values of samples included in a filtering target block. In an example, a filtering strength may vary according to a gradient value that is calculated by using sample values adjacent to a boundary between blocks.

In deblocking filtering, vertical filtering on a current block may be performed after horizontal filtering, or horizontal filtering on a current block may be performed after vertical filtering. When performing vertical filtering after horizontal filtering or performing horizontal filtering after vertical filtering, the result of samples of on which filtering is performed twice become different as nonlinear filtering is applied. Accordingly, the image encoding apparatus and the image decoding apparatus have to perform filtering in a predetermined order (vertical filtering after horizontal filtering, or horizontal filtering after vertical filtering) such that the image encoding apparatus and the image decoding apparatus obtain the same result (or in order to prevent mismatch between the encoder/decoder). A filtering order may be identically determined implicitly in the image encoding apparatus and the image decoding apparatus, or may be determined explicitly by signaling a flag.

Meanwhile, in an embodiment of the present invention, a filtering strength may be used to have the same meaning as a boundary strength (BS).

Figure 12:
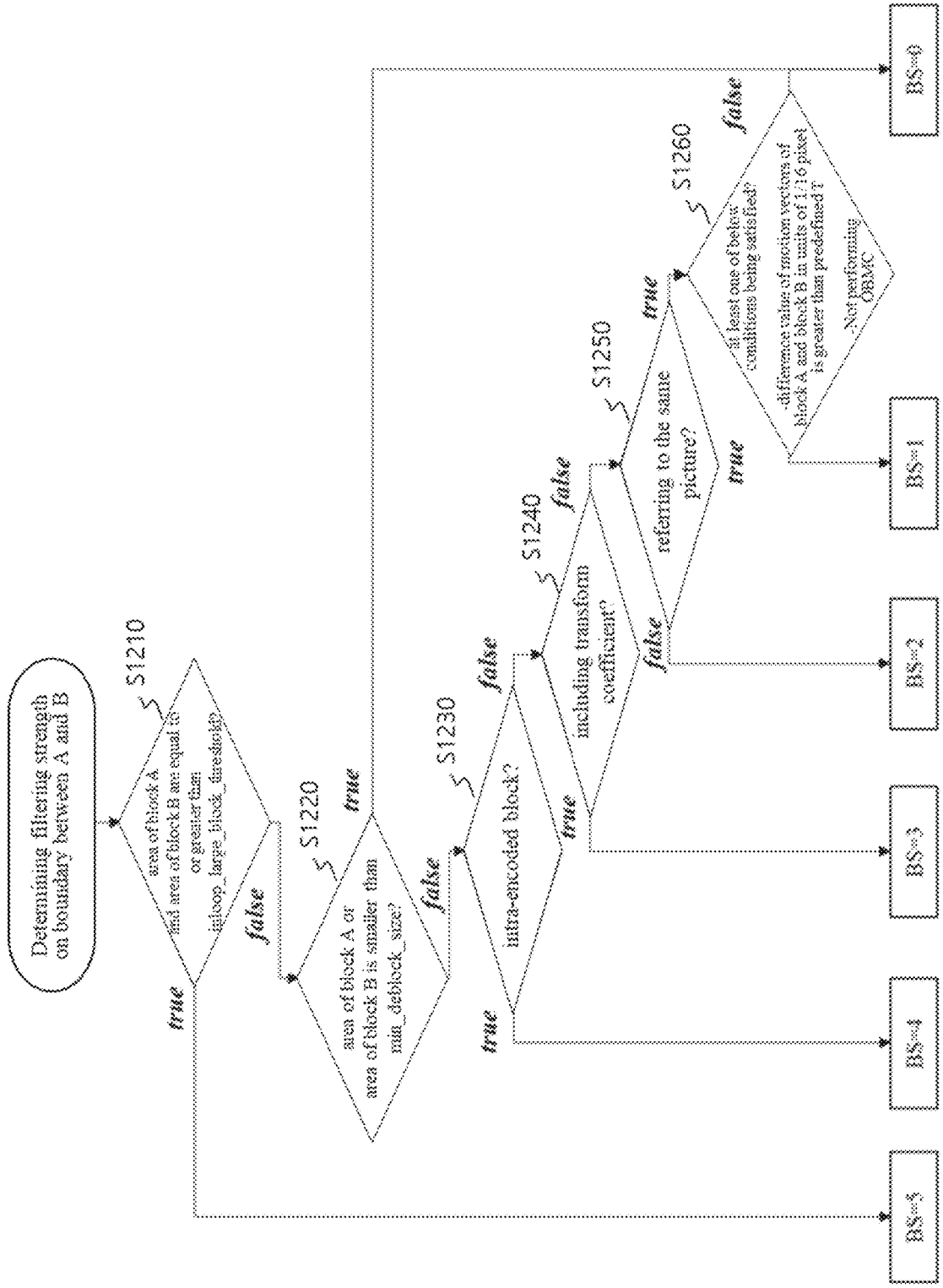
FIG. 12 is a view of a flowchart showing a method of determining a filtering strength according to an embodiment of the present invention.

FIG. 12 is a view of a flowchart showing a method of determining a filtering strength according to an embodiment of the present invention. In FIG. 12, a block A and a block B are blocks adjacent with each other, and may be the block A and the block B described in FIG. 8.

Referring to FIG. 12, in S1210, when both of an area of the block A and an area of the block B are equal to or greater than inloop_large_block_threshold, a filtering strength may be determined as the strongest filtering strength (BS=5) (S1210—true). On the contrary, when both of an area of the block A or an area of the block B are smaller than inloop_large_block_threshold, S1220 may be performed (S1210—false).

Herein, inloop_large_block_threshold may be a value predefined in the image encoding apparatus and the image decoding apparatus, or information signaled from the image encoding apparatus to the image decoding apparatus.

When a block size is defined as MXN (M and N are 2n, n is a positive integer), an area of the block may be defined as M*N.

Meanwhile, when at least one of an area of the block A and an area of the block B is equal to or greater than inloop_large_block_threshold that is a predefined constant value, a filtering strength may be determined as the strongest filtering strength (for example, BS=5).

Meanwhile, when determining a filtering strength, at least one of a width and a height of a block may be used rather than an area of the block.

In addition, when determining a filtering strength, a block depth may be used rather than an area of the block. In an example, when a block depth is large, it may mean that a block size is small.

In addition, the strongest filtering strength is not limited to BS=5, indication on using a filter having a length of J for a filter length that is applied to one block may be performed. Herein, J is a positive integer equal to or greater than 3. In other words, herein, the entire filter length may be equal to or greater than 2×J.

A strong filtering strength (for example, BS=5) may mean changing values of at least V samples included in the block A or block B by performing filtering by using at least U samples included in the block A or block B. For example, U and V may be a positive integer, may be 4 and 3, 5 and 4, 6 and 4, 7 and 4, 6 and 5, 5 and 3, or 6 and 3, respectively, and U may be equal to or greater than V.

In addition, when a value of a filtering strength ranges 0 to 3, the strongest filtering strength may be set as BS=3.

In addition, when a value of a filtering strength ranges 0 to 2, the strongest filtering strength may be set as BS=2.

As described above, a filtering strength may be determined on the basis of a block size (or at least one of an area, a width, a height, and a depth).

When a block has a large block size, there is a high probability that correlation between samples is high, and thus strong filtering is used so as to efficiently remove blocking artifacts.

In S1220, when a size of the block A or a size of the block B is smaller than min_deblock_size, a filtering strength may be determined as the weakest filtering strength (BS=0) (S1220—true). On the contrary, when a size of the block A and a size of the block B are equal to or greater than min_deblock_size, S1230 may be performed (S1220—false).

In an example, when respective widths of the block A and the block B which are horizontally adjacent are smaller than min_deblock_size, a filtering strength on a vertical boundary between blocks may be determined as the weakest filtering strength (BS=0).

In an example, when respective heights of the block A and the block B which are horizontally adjacent are smaller than min_deblock_size, a filtering strength on a vertical boundary between blocks may be determined as the weakest filtering strength (BS=0).

In an example, when respective heights of the block A and the block B which are vertically adjacent are smaller than min_deblock_size, a filtering strength on a horizontal boundary between blocks may be determined as the weakest filtering strength (BS=0).

In an example, when respective widths of the block A and the block B which are vertically adjacent are smaller than min_deblock_size, a filtering strength on a horizontal boundary between blocks may be determined as the weakest filtering strength (BS=0).

Alternatively, when at least one of a picture, a subpicture, a slice, a tile group, a tile, a brick, a CTU, a coding block, a prediction block, a transform block, and a subblock is partitioned into units of min_block_size×min_block_size, filtering may not be performed on a vertical boundary or horizontal boundary of the block A and of the block B which does not correspond to the boundary of the corresponding unit. In other words, when at least one of a picture, a subpicture, a slice, a tile group, a tile, a brick, a CTU, a coding block, a prediction block, a transform block, and a subblock is partitioned into units of min_block_size×min_block_size, filtering may be performed on a vertical boundary or horizontal boundary of the block A and of the block B which corresponds to the boundary of the corresponding unit. Herein, min_block_size may mean a size of a minimum coding unit, a size of a minimum prediction unit, a size of a minimum transform unit, a size of a minimum coding block, a size of a minimum prediction block, a size of a minimum transform block, a size of a minimum block, a minimum size for performing deblocking, and may be a positive integer of 1, 2, 4, 8, etc.

Meanwhile, min_deblock_size may be information signaled from the image encoding apparatus to the image decoding apparatus, and may be signaled in units of sequence parameter set, picture parameter set, subpicture header, slice/tile header, brick, CTU, etc. In addition, min_deblock_size may be a value preset in the image encoding apparatus and the image decoding apparatus.

The weakest filtering strength (for example, BS=0) may mean changing values of at least V samples included in the block A or block B by performing filtering by using at least U samples included in the block A or block B. For example, U and V may be a positive integer, and may be 0 and 0, 1 and 1, 2 and 1, 2 and 2, or 3 and 2, respectively, and U may be equal to or greater than V. Herein, when BS=0, at least one of U and V may differ from at least one of U and V of a case where BS=1. In addition, when BS=0, at least one of U and V may be smaller than a value of at least one of U and V of a case where BS=1.

Meanwhile, the weakest filtering strength (for example, BS=0) may mean not performing filtering.

In S1230, when at least one of the block A and the block B is a block encoded through intra-prediction, a filtering strength may be determined as a strong filtering strength (for example, BS=4) (S1230—true). On the contrary, when both of the block A and the block B are encoded through inter-prediction, S1240 may be performed (S1230—false).

In cased of a block encoded through intra-prediction, there is a high probability that blocking artifacts occurs than a block encoded through inter-prediction due to quantization, and thus in order to efficiently remove blocking artifacts, strong filtering (BS=4) may be performed on the intra-predicted block.

Figure 13:
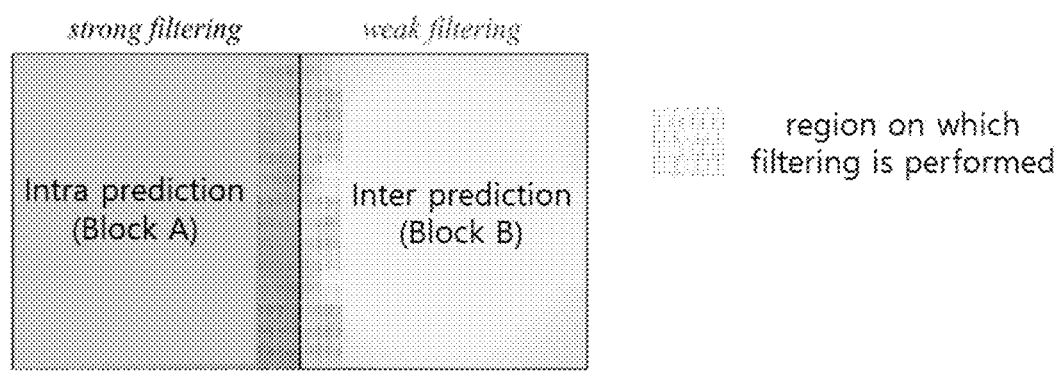
FIGS. 13 and 14 are views respectively showing a method of determining a filtering strength according to a prediction mode according to an embodiment of the present invention.
Figure 14:
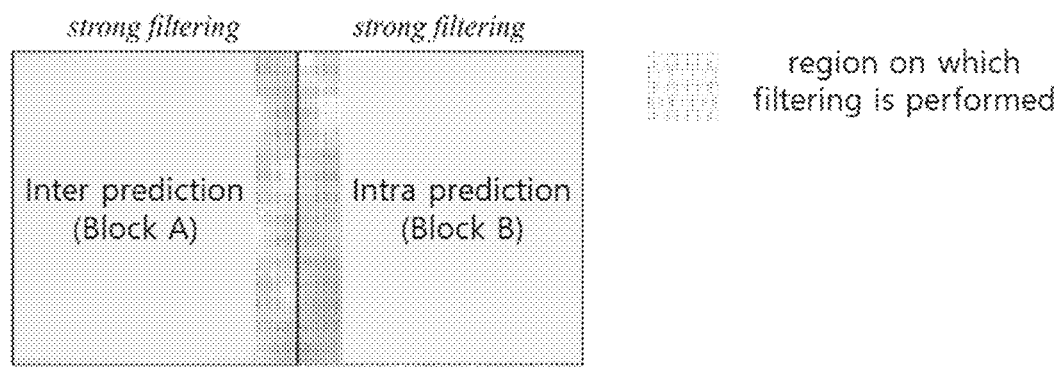

FIGS. 13 and 14 are views respectively showing a method of determining a filtering strength according to a prediction mode according to an embodiment of the present invention.

Referring to FIG. 13, when a block A is encoded through intra-prediction and a block B is encoded through inter-prediction, filtering may be performed on the block A with a strong filtering strength, but filtering may be performed on the block B with a weak filtering strength.

Accordingly, in case of an intra-predicted block, there is a high probability that a prediction error occurs in a region close to a right or bottom within the block. In addition, in case of an inter-predicted block, a prediction error may be relatively low in comparison to the intra-predicted block. Accordingly, when the block A is intra-predicted, and the block B is inter-predicted, blocking artifacts can be efficiently reduced by applying a filtering strength to the block B which is lower than that of the block A when performing filtering on a boundary between the blocks A and B.

Referring to FIG. 14, when a block A is a block encoded through inter-prediction, and a block B is a block encoded through intra-prediction, a strong deblocking filter strength may be applied to the blocks A and B. Intra-prediction on the block B that is an intra-predicted block is performed by referring to samples of a partial right boundary of the block A, and thus when a quantization error is present in the block A, there is a high probability that the error is transferred to the block B as it is. Alternatively, when a quantization error is not present in the block A, in the block B, there is less likelihood that a quantization error occurs nearby a boundary adjacent to the block A.

In addition, a filtering strength may be determined according to whether or not a prediction mode of the block A and a prediction mode of the block B are different from each other.

In an example, when a prediction mode of the block A and a prediction mode of the block B are different from each other, a filtering strength may be determined as a weak filtering strength (for example, BS=1).

Meanwhile, a strong filtering strength (for example, BS=4) may mean changing values of at least V samples included in the block A or block B by performing filtering by using at least U samples included in the block A or block B. For example, U and V may be a positive integer, may be 3 and 2, 4 and 3, 5 and 4, 6 and 4, 7 and 4, 6 and 5, 5 and 3, or 6 and 3, respectively, and U may be equal to or greater than V. Herein, when BS=4, at least one of U and V may differ from at least one of U and V of a case where BS=5. In addition, when BS=4, at least one of U and V may be smaller than a value of at least one of U and V of a case where BS=5.

In addition, when a value of a filtering strength ranges 0 to 3, a strong filtering strength may be set as BS=2.

In addition, when a value of a filtering strength ranges 0 to 2, a strong filtering strength may be set as BS=2.

In S1240, when a transform coefficient of the block A or block B is at least one, a filtering strength may be determined as a medium filtering strength (BS=3) (S1240—true). On the contrary, when a transform coefficient of the block A or block B is not present, S1250 may be performed (S1240—false).

Meanwhile, a medium filtering strength (for example, BS=3) may mean changing values of at least V samples included in the block A or block B by performing filtering by using at least U samples included in the block A or block B. For example, U and V may be a positive integer, may be 2 and 1, 2 and 2, 3 and 2, 4 and 3, 5 and 4, 6 and 4, 7 and 4, 6 and 5, 5 and 3, or 6 and 3, respectively, and U may be equal to or greater than V. Herein, when BS=3, at least one of U and V differ from at least one of U and V of a case where BS=4. In addition, when BS=3, at least one of U and V may be smaller than a value of at least one of U and V of a case where BS=4.

In addition, when a value of a filtering strength ranges 0 to 3, a medium filtering strength may be set as BS=1.

In addition, when a value of a filtering strength ranges 0 to 2, a medium filtering strength may be set as BS=1.

In S1250, when a reference picture of the block A and a reference picture of the block B are different from each other, a filtering strength may be determined as a medium filtering strength (for example, BS=2) (S1250—false). On the contrary, when a reference picture of the block A and a reference picture of the block B are identical, S1260 may be performed (S1250—true).

Meanwhile, a medium filtering strength (for example, BS=2) may mean changing values of at least V samples included in the block A or block B by performing filtering by using at least U samples included in the block A or block B. For example, U and V may be a positive integer, may be 1 and 1, 2 and 1, 2 and 2, 3 and 2, 4 and 3, 5 and 4, 6 and 4, 7 and 4, 6 and 5, 5 and 3, or 6 and 3, respectively, and U may be equal to or greater than V. Herein, when BS=2, at least one of U and V may differ from at least one of U and V of a case where BS=3. In addition, when BS=2, at least one of U and V may be smaller than at value of at least one value of U and V of a case where BS=3.

In addition, when a value of a filtering strength ranges 0 to 3, a medium filtering strength may be set as BS=1.

In addition, when a value of a filtering strength ranges 0 to 2, a medium filtering strength may be set as BS=1.

In S1260, when at least one of the below conditions is satisfied, a filtering strength is determined as a weak filtering strength (BS=1) (S1260—true). On the contrary, when the below conditions are not satisfied, a filtering strength may be determined as the weakest filtering strength (BS=0) (S1260—false). Herein, T may be a positive integer, for example, 16.

When a difference value of motion vectors of the block A and the block B in units of $1/16$ pixel is greater than a predefined T When OBMC (overlapped block motion compensation) using motion information on the block A is not performed on the block B When OBMC (overlapped block motion compensation) using motion information on the block B is not performed on the block A A filtering strength according to the present invention may be determined by whether or not OBMC (overlapped block motion compensation) is used.

When OBMC is used on the current block B by using motion information on the adjacent block A, blocking artifacts may be less than a case where OBMC is not used for a boundary of the blocks A and B. Accordingly, herein, image quality can be improved by setting a filtering strength to a low value.

In an example, as S1260 of FIG. 12, when OBMC is used, a filtering strength BS may be determined to 0, and when OBMC is not used, a filtering strength BS may be determined to 1.

Meanwhile, when OBMC is used only for Y component (or luma component), a filtering strength may be determined to be low when performing filtering only on the Y component, and a filtering strength may be maintained when performing filtering on U and V components (or chroma component).

In an example, when OBMC is used only for a luma component, a filtering strength BS on the luma component is determined to 0, and a filtering strength BS on a chroma component may be determined to 1.

Figure 15:
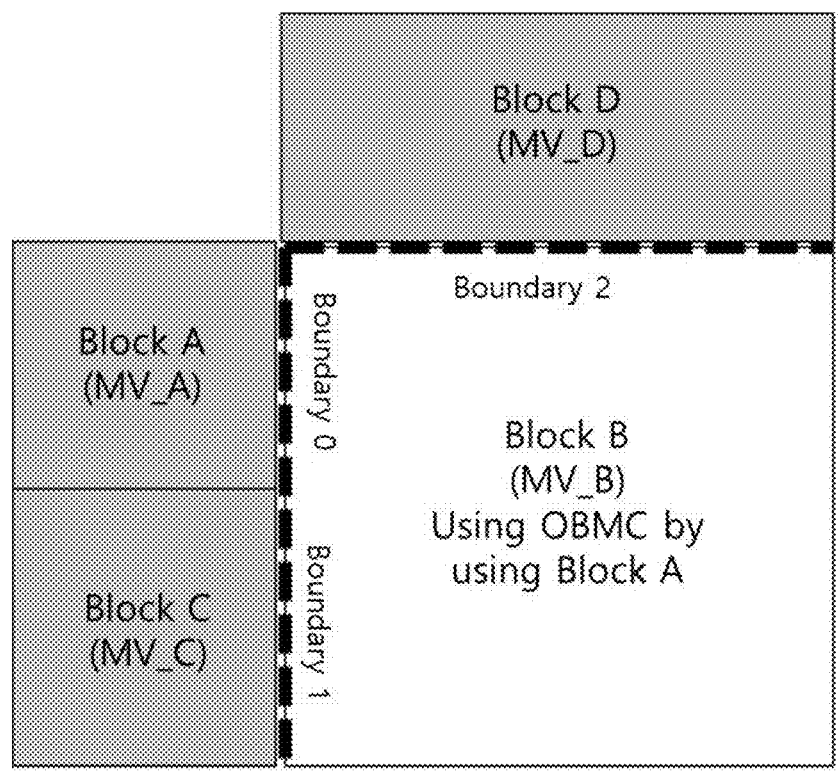
FIG. 15 is a view showing a method of determining a filtering strength of a block on which OBMC is performed according to an embodiment of the present invention.

FIG. 15 is a view showing a method of determining a filtering strength of a block on which OBMC is performed according to an embodiment of the present invention.

In FIG. 15, when OBMC using motion information on a block A is performed on a block B, a filtering strength on a boundary 0 between the block A and the block B may be determined as the lowest filtering strength (BS=0).

Meanwhile, even when OBMC is performed on the block B, OBMC is performed by using motion information on the block A, and thus a filtering strength on a boundary 1 between the block B and a block C, and on a boundary 2 between the block B and a block D may be determined as a low filtering strength (BS=1).

Meanwhile, a weak filtering strength (for example BS=1) may mean changing values of at least V samples included in the block A or block B by performing filtering on at least U samples included in the block A or block B. For example, U and V may be a positive integer, may be 1 and 1, 2 and 1, 2 and 2, 3 and 2, 4 and 3, 5 and 4, 6 and 4, 7 and 4, 6 and 5, 5 and 3, or 6 and 3, respectively, and U may be equal to or greater than V. Herein, when BS=1, at least one of U and V may differ from at least one of U and V of a case where BS=2. In addition, when BS=1, at least one of U and V may be smaller than a value of at least one of U and V of a case where BS=2.

In addition, when a value of a filtering strength ranges 0 to 3, a weak filtering strength may be set as BS=1.

In addition, when a value of a filtering strength ranges 0 to 2, a weak filtering strength may be set as BS=1.

Each step of FIG. 12 has been described that is sequentially performed. However, each step is not limited to the order shown in FIG. 12, but may be performed independently or in a different order.

In addition, a condition for each step of FIG. 12 may be used for determining, in addition to a filtering strength, whether or not to perform filtering, a number/position of samples used in filtering, a number of filtered samples, a filtering type, etc.

In an example, whether or not to use OBMC may be used for determining a filter type. When OBMC is performed on the block B by using motion information on the block A, it may be determined to use a filter type of a low strength on a corresponding boundary, or to use few samples near the boundary in filtering.

When a filtering strength is determined as the weakest filtering strength (BS=0), deblocking filtering may not be performed, or deblocking filtering may be performed by applying a weak filtering strength (BS=0). The weakest filtering strength (for example BS=0) may mean changing values of at least V samples included in the block A or block B by performing filtering by using at least U samples included in the block A or block B. For example, U and V may be a positive integer, may be 0 and 0, 1 and 1, 2 and 1, 2 and 2, 3 and 2, 4 and 3, 5 and 4, 6 and 4, 7 and 4, 6 and 5, 5 and 3, or 6 and 3, respectively, and U may be equal to or greater than V. Herein, when BS=0, at least one of U and V may differ from at least one of U and V of a case where BS=1. In addition, when BS=0, at least one of U and V may be smaller than a value of at least one of U and V of a case where BS=1.

By using at least one of a width and a height of two blocks forming a block boundary, a number and/or position of samples used in filtering on a block adjacent to a filtering target boundary may be determined. Herein, the number of samples used in filtering may be determined according to a size of a block having a smaller width or height among the two blocks. In addition, an area or depth of the block may be used rather than the size.

Figure 16:
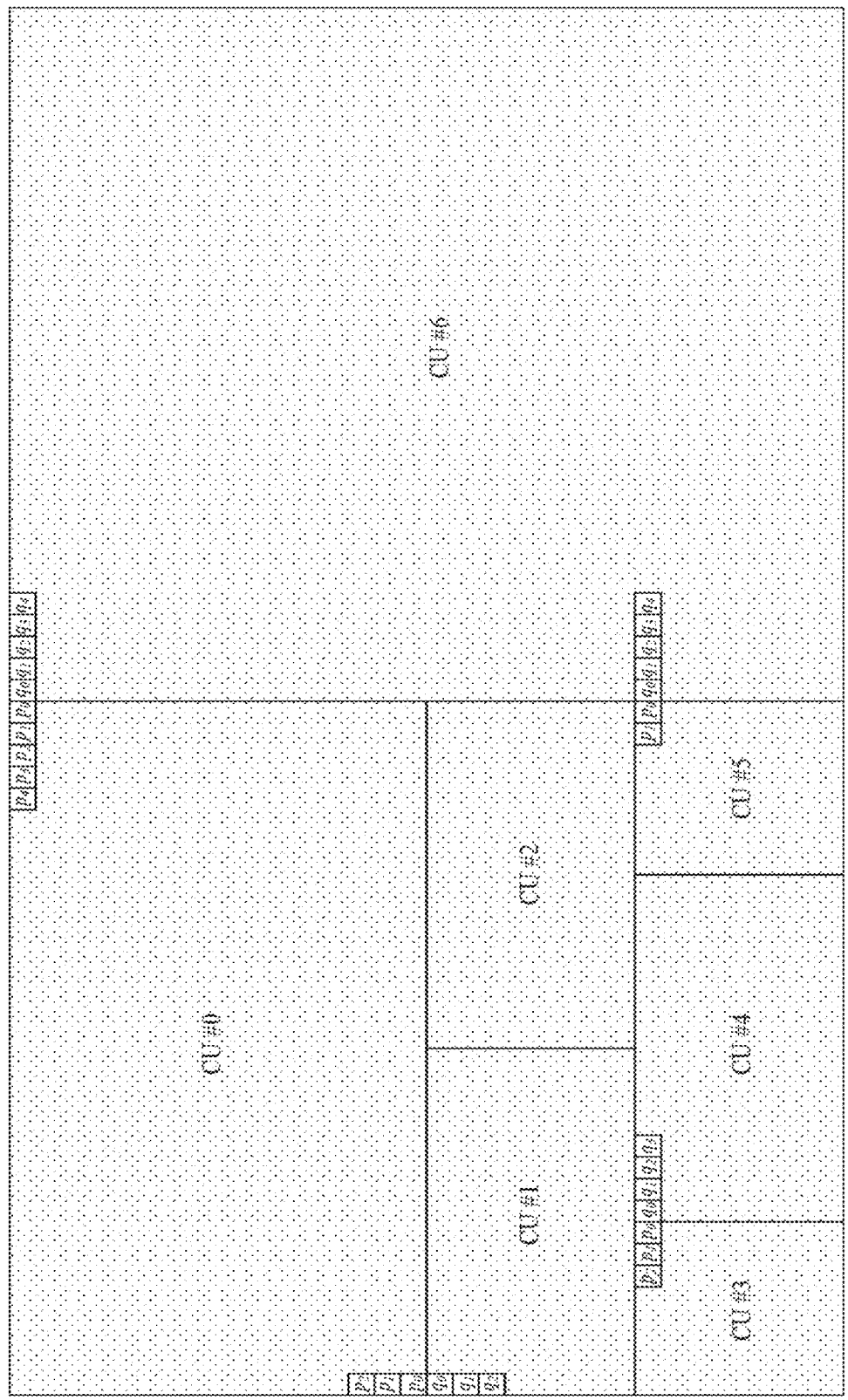
FIG. 16 is a view showing an example of filtering according to a block partition according to an embodiment of the present invention.

FIG. 16 is a view showing an example of filtering according to a block partition according to an embodiment of the present invention.

In FIG. 16, a 64×32 region is partitioned into CU #0 to #6 having square and rectangle shapes. In the corresponding example, a block is represented in a shape of a coding unit (CU). However, it is not limited thereto, the block may be a PU, a TU, a CB (coding block), a PB (prediction block), a TB (transform block), a sub-CU, a sub-TU rather than the CU.

CU #0 is a 32×16 block on which transform of a 32×16 size is used, CU #1, CU #2, and CU #4 are blocks on which transform of a 16×8 size is used, CU #3 and CU #5 are blocks on which transform of an 8×8 size is used, and CU #6 is a block on which transform of a 32×32 is used.

CU #0 and CU #6 are adjacent in a horizontal direction, and thus a vertical boundary is present, and CU #0 and CU #1 are adjacent in a vertical direction, and thus a horizontal boundary is present.

Referring to FIG. 16, a number and/or position of samples used in filtering on a vertical boundary between CU #0 and CU #6 may be determined on the basis of at least one of a width of CU #0 and a width of CU #6.

Meanwhile, when performing filtering on the vertical boundary between CU #0 and CU #6, and a width or height of at least one block among blocks CU #0 and CU #6 is greater than inloop_large_block_threshold, filtering may be performed on V samples by using U samples within CU #0 that are continuous from the vertical boundary in a horizontal direction, or filtering may be performed on V samples by using U samples within CU #6. For example, U and V may be a positive integer, may be 4 and 3, 5 and 4, 6 and 4, 7 and 4, 6 and 5, 5 and 3, or 6 and 3, respectively, and U may be equal to or greater than V.

Herein, when a width of CU #0 and a width of CU #6 are identical, a number of samples within CU #0 which is used for a deblocking filter and a number of samples within CU #6 which is used for a deblocking filter may be identical. In addition, when a width of CU #0 and a width of CU #6 are identical, a number of samples within CU #0 on which deblocking filtering is performed and a number of samples within CU #6 on which deblocking filtering is performed may be identical.

In addition, a number and/or position of samples used in filtering on a horizontal boundary between CU #0 and CU #1 may be determined on the basis of at least one of a height of CU #0 and a height of CU #1.

Meanwhile, when performing filtering on the horizontal boundary between CU #0 and CU #1, and a width or height of at least one block among blocks CU #0 and CU #1 is greater than inloop_large_block_threshold, filtering may be performed on V samples by using U samples within CU #0 which are continuous from the horizontal boundary in a vertical direction, or filtering may be performed on V samples by using U samples within CU #1. For example, U and V may be a positive integer, may be 0 and 0, 1 and 1, 2 and 1, 2 and 2, 3 and 2, 4 and 3, 5 and 4, 6 and 4, 7 and 4, 6 and 5, 5 and 3, or 6 and 3, respectively, and U may be equal to or greater than V.

Herein, when a height of CU #0 and a height of CU #1 are different, a number of samples within CU #0 which is used for a deblocking filter and a number of samples within CU #1 which is used for a deblocking filter may be different from each other. For example, when a height of CU #1 is smaller than a height of CU #0, a number of samples within CU #1 which is used for a deblocking filter may be smaller than a number of samples within CU #0 which is used for a deblocking filter. In addition, when a height of CU #0 and a height of CU #1 are different, a number of samples within CU #0 on which deblocking filtering is performed and a number of samples within CU #1 on which deblocking filtering is performed may be different from each other. For example, when a height of CU #1 is smaller than a height of CU #0, a number of samples within CU #1 on which deblocking filtering is performed may be smaller than a number of samples within CU #0 on which deblocking filtering is performed.

In addition, a filtering strength on a filtering target boundary may be determined by using at least one of a width and a height of two blocks forming a block boundary. In addition, a filtering strength may be determined on the basis of an area or depth of a block rather than a size. In addition, a number and/or position of samples used in filtering on a block adjacent to a filtering target boundary may be determined by using at least one of a width and a height of two blocks forming a block boundary. Herein, the number of samples used in filtering may be determined according to a size of a block having a smaller width or height among the two blocks. Alternatively, the number of samples used in filtering may be determined according to a size of a block having a greater width or height among the two blocks.

In addition, a number and/or position of samples used in filtering on a vertical boundary between CU #5 and CU #6 may be determined on the basis of at least one of a width of CU #5 and a width of CU #6.

Meanwhile, when performing filtering on a vertical boundary between CU #5 and CU #6, and a width or height of at least one block among blocks CU #5 and CU #6 is greater than inloop_large_block_threshold, filtering may be performed on V samples by using U samples within CU #5 which are continuous from the vertical boundary in a horizontal direction, or filtering may be performed on V samples by using U samples within CU #6. Herein, for example, U and V may be a positive integer, may be 0 and 0, 1 and 1, 2 and 1, 2 and 2, 3 and 2, 4 and 3, 5 and 4, 6 and 4, 7 and 4, 6 and 5, 5 and 3, or 6 and 3, respectively, and U may be equal to or greater than V.

Herein, when a width of CU #5 and a width of CU #6 are different, a number of samples within CU #5 which is used for a deblocking filter and a number of samples within CU #6 which is used for a deblocking filter may be different from each other. For example, when a width of CU #5 is smaller than a width of CU #6, a number of samples within CU #5 which is used for a deblocking filter may be smaller than a number of samples within CU #6 which is used for a deblocking filter.

In addition, when a width of CU #5 and a width of CU #6 are different, a number of samples within CU #5 on which deblocking filtering is performed and a number of samples within CU #6 on which deblocking filtering is performed may be different from each other. For example, when a width of CU #5 is smaller than a width of CU #6, a number of samples within CU #5 on which deblocking filtering is performed may be smaller than a number of samples within CU #6 on which deblocking filtering is performed.

Referring FIG. 16, when determining a filtering strength on a vertical boundary between CU #0 and CU #6, a width or height of at least one block among two blocks CU #0 and CU #6 may be used. In addition, when determining a filtering strength on a horizontal boundary between CU #0 and CU #1, a width or height of at least one block among two blocks CU #0 and CU #1 may be used.

Meanwhile, a filtering strength on samples within a block having a greater size may be determined to be a stronger filtering strength than a filtering strength on samples within a block having a smaller size. For example, a filtering strength on a vertical boundary between CU #0 and CU #6 may be determined to be a stronger filtering strength than a filtering strength on a horizontal boundary between CU #0 and CU #1.

Meanwhile, transform of a rectangle shape such as 32×16, 16×8, etc. may be performed on a block of a rectangle shape, and filtering may be performed on the corresponding block of a rectangle form, a unit, or a transform boundary.

Figure 17:
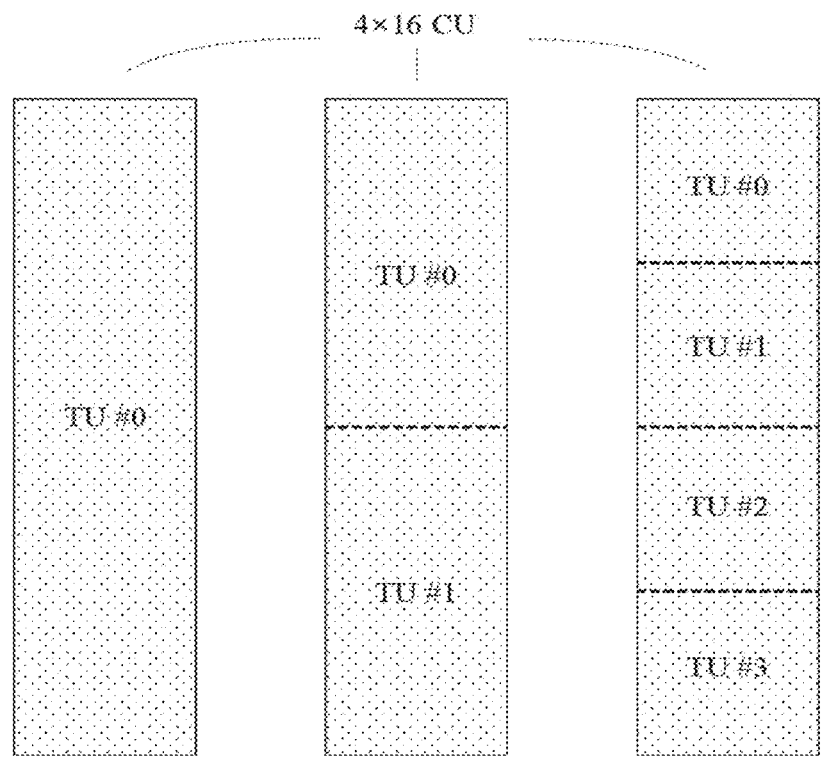
FIG. 17 is a view showing various transform regions according to an embodiment of the present invention.

In order to improve efficiency of transform in a rectangle CU such as CU #1 or CU #2 of FIG. 16 where an aspect ratio thereof is large, various transform regions may be determined as shown in FIG. 17. Deblocking filtering may be performed on boundaries between various transform regions by using at least one coding parameter on the determined transform region.

As described with reference to FIGS. 8 to 17, filtering on samples adjacent to a block boundary may be performed by using at least one of the determined filtering strength, and a number and/or positions of samples using in filtering.

Hereinafter, a filtering method according to a filtering strength (BS) according to an embodiment of the present invention will be described in detail.

When a value of a filtering strength ranges 0 to 5, filtering may be performed by using [Equation 1] when a BS size is smaller than 4, [Equation 2] when a BS is 4, and [Equation 3] and [Equation 4] when a BS is 5.

$$\Delta=\text{Clip}[-tc,tc,\{(q0-p0)<<2+(p1-q1)+4\}/8]p'0=p0+\Delta q'0=q0+\Delta \quad \text{[Equation 1]}$$

Equation 1 is for an example where a BS value is smaller than 4.

Herein, a value of tc may be determined by a β value that is determined by |p2−p0|, |q2−q0|, and a quantization parameter QP. A Clip function of Clip{a, b, c} processes such that a value of c does not exceeds values between a and b. In other words, Clip of Equation 1 processes such that ((q0−p0)<<2+(p1−q1)+4)/8 does not exceed values between −tc and tc.

As Equation 1, a value of p'0 and q'0 may be obtained by using four tap filter using q1, q0, p0, and p1. Filtering on a sample value of p'1 and q'1 may be performed by using a method similar to the method of calculating p'0 and q'0. Herein, pn and qn may mean a position of a sample as an example of FIG. 16. Herein, n is a positive integer including 0.

$$q'0=(1\times q2+2\times q1+2\times q0+2\times p0+1\times p1+4)/8 \quad \text{[Equation 2]}$$

Equation 2 is for example of calculating q'0 when BS=4.

Herein, five tap filter may be applied to a filtering coefficient value in an order of 1,2,2,2,1 and whether or not being a real edge may be determined by α and β values determined by the quantization parameter. A number of samples on which filtering is performed by using Equation 2 is limited up to J samples (J in case of a luma signal, and K in case of a chroma signal), and thus filtering may be performed up to L samples for each block adjacent to a boundary. Herein, J, K, and L may be a positive integer, for example, J may be 6, K may be 4, and L may be 3.

An embodiment of the present invention may provide a filtering method that additionally includes a filtering strength (for example, BS is 5) on a boundary adjacent to a block having a relatively large size. Equation 3 and Equation 4 may be used in filtering on a boundary of a block having a relatively large size. For example, for a block having a large size, whether or not being a block having a large size may be determined by comparing with a threshold value T. Herein, T may be a positive integer, for example, 32. For example, when a width of a specific block is equal to or greater than T, the specific block may be determined as a block having a large size. In another example, when a height of a specific block is equal to or greater than T, the specific block may be determined as a block having a large size.

For example, at least one of a number of samples and a number of filtered samples which are used in filtering using Equation 3 or Equation 4 may be greater than at least one of a number of samples and a number of filtered samples which are used in filtering using the Equation 2.

In other words, Equation 3 or Equation 4 may represent an example of a filtering method using more samples.

$$q'0=(1\times q3+2\times q2+3\times q1+4\times q0+3\times p0+2\times p1+1\times p2+8)/16 \quad \text{[Equation 3]}$$

Equation 3 is an equation for calculating q'0 on a boundary adjacent to a block having a relatively large size. In Equation 3, seven tap filter of 1,2,3,4,3,2,1 is used in which a number of samples used in filtering is increased than that of Equation 2. Accordingly, blocking artifacts can be effectively reduced by performing filtering by increasing a number of samples adjacent to a boundary for a block having a relatively large size.

$$q'4=(4\times q5+3\times q4+3\times q3+2\times q2+2\times q1+1\times q0+8)/16 \quad \text{[Equation 4]}$$

Equation 4 is an equation used for performing filtering on a sample of q'4. By using Equation 4, blocking artifacts can be reduced by performing filtering on q'4 adjacent to a boundary that is adjacent to a block having a relatively large size.

Blocking artifacts can be reduced by increasing a number of samples used in filtering when a block size increases. In detail, filtering may be performed by using a seven-tap filter such as Equation 3 on a boundary adjacent to a block having a relatively large size.

In an example, for a vertical boundary, when a width of a current block is equal to or greater than 32, a seven-tap filter may be used. On the contrary, when a width of a current block is smaller than 32, a filter with a tap smaller than seven taps may be used for vertical boundary filtering.

In another example, for a horizontal boundary, when a height of a current block is equal to or greater than 32, a seven tap filter may be used. On the contrary, when a height of a current block is smaller than 32, a filter with a tap smaller than seven tap may be used for horizontal boundary filtering.

In an embodiment of the present invention, examples of a number of samples used in filtering and a number of filtered samples are not limited to methods described with the above equations, and in addition thereto, various filtering methods may be differently applied according to at least one of a size, an area, and a depth of a block.

Meanwhile, when a value of a filtering strength ranges 0 to 3, filtering may be performed by using [Equation 1] when a BS size is 1, [Equation 2] when a BS is 2, and [Equation 3] and [Equation 4] when a BS is 3.

Meanwhile, a number of samples used in filtering and a number of filtered samples may be determined on the basis of a value of a quantization parameter of each block on which filtering is performed.

In an example, by comparing quantization parameter values of respective blocks A and B which are adjacent with each other, filtering may be performed on V samples by using U samples for a block a having the greater quantization parameter value, and filtering may be performed on Y samples by using X samples for a block having the smaller quantization parameter value. Herein, U and V may be determined to be equal to or greater than X and Y, respectively.

Meanwhile, U, V, X, and Y may be a positive integer, U may be equal to or greater than V, and X may be equal to or greater than Y.

Meanwhile, a number of samples used in filtering and a number of filtered samples may be determined by at least one of a coding parameter of a current block and a coding parameter of an adjacent neighboring block.

Meanwhile, samples used in filtering may be limited to samples included in two blocks.

Meanwhile, a filtering strength may be determined on the basis of a prediction mode.

In an example, when a block including a sample adjacent to a block boundary is encoded/decoded by using IBC (intra block copy) mode, a filtering strength may be determined as a weak filtering strength (BS=1).

In another example, when a block boundary is a boundary of a transform block, and a block including a sample adjacent to a block boundary is encoded/decoded by using CIIP (combined intra inter prediction), a filtering strength maybe determined as a strong filtering strength (BS=2).

Meanwhile, a filtering strength may be determined on the basis of a transform mode.

In an example, when secondary transform is performed on a block including a sample adjacent to a block boundary, a filtering strength may be determined as BS=2. When secondary transform is performed, there is a high probability that an error occurs in a high frequency component of a residual signal, and thus a high filtering strength may be used. In addition, a filtering strength may be determined by taking into account a block size and whether or not to use secondary transform.

Meanwhile, a number of samples used in filtering may be determined on the basis of a size of a current block and a neighboring block, and a transform mode.

In an example, when respective widths of a block A and block B are 32, DCT-2 horizontal transform is used as a transform mode of the block A, and DST-7 or DCT-8 horizontal transform is used as a transform mode of the block B, a number of samples used in filtering within the block A may be determined to be smaller than a number of samples used in filtering within the block B.

Meanwhile, a filtering strength may be determined according to whether a boundary corresponds to a boundary between a transform block and a transform block, a boundary between a coding block and a transform block, or a boundary between a coding block and a coding block.

Meanwhile, a filtering strength may be determined according to a transform and quantization type of a block.

In an example, when a transform and quantization type is equal to or greater than a size of 64×32 or 32×64, the strongest filtering strength may be used.

Meanwhile, a number of samples used in filtering may increase when units of transform and quantization becomes large.

At least one of embodiments of the present invention may be used for luma signal deblocking filtering or chroma signal deblocking filtering.

When performing the filtering, a number of samples used in filtering may be differently determined according to a block size, and a number of samples used in filtering may be increased when at least one of a coding block size, a prediction block size, and a transform block size becomes large.

When performing the filtering, a number of filtered samples may be differently determined according to a block size, and a number of filtered samples may be increased when at least one of a coding block size, a prediction block size, and a transform block size becomes large.

Meanwhile, a filtering strength applied to a luma component may be identically applied to a chroma component. Alternatively, a filtering strength applied to a luma component and a filtering strength applied to a chroma component may be independent with each other.

Meanwhile, a number of samples used in filtering on a luma component may be independent from a chroma component. A number of samples used in filtering on a chroma component may be equal to or smaller than a number of samples used for a luma component.

Meanwhile, at least one of whether or not to perform filtering by using samples around a boundary of a filtering target, a filtering strength, and a filtering method may be additionally determined. Herein, whether or not samples around the boundary correspond to a real edge of an image, or whether or not blocking artifacts occurs due to encoding/decoding a block may be determined by using a gradient value of samples around the boundary, and whether or not to perform filtering may be determined by using the above result. Herein, in place of the gradient value, a result value obtained by performing calculation by using at least one value of samples included in the block A and the B may be used.

Hereinafter, filtering on a tile boundary according to an embodiment of the present invention will be described. Herein, in place of a tile, boundary filtering that will be described later may be used on at least one of a picture, a subpicture, a slice, a brick, etc.

A tile may be used in various application fields, and particularly, useful when encoding/decoding a high resolution 360-degree image. When generating a 360 image by projecting a 3D space to surfaces of a 2D form, surfaces may not be spatially continuous as projection methods such as CMP (cube map projection) other than ERP (equirectangular projection) rearrange multiples surfaces. Alternatively, a picture boundary may be continuous to an arbitrary tile boundary with each other, or picture boundaries may be continuous with each other. Generally, a single surface is set as a single tile in the image encoding apparatus, and thus whether or not to perform filtering on a tile boundary and a method thereof are important.

When filtering is performed on all boundaries, image degradation may occur as filtering is performed on a boundary between non-continuous surfaces. On the contrary, when filtering is not performed on all boundaries, blocking artifacts may occur as filtering is not performed on a boundary of continuous surfaces. In addition, when filtering is not performed on a picture boundary, blocking artifacts may occur when outputting a decoded picture to a user in a 3D form.

In order to solve the above problem, the image encoding/decoding apparatus may entropy encode/decode whether or not to perform filtering on a picture boundary of each tile and a tile boundary, and a filtering method through a header (a sequence parameter set, a picture parameter set, an adaptation parameter set, a slice header, a tile header, a brick header, etc.). Alternatively, a method of projecting and rearranging a 360 image may be entropy encoded/decoded through a header (a sequence parameter set, a picture parameter set, an adaptation parameter set, a slice header, a tile header, a brick header, etc.) so that the image encoding/decoding apparatus may implicitly determine whether or not to perform filtering on a picture boundary of each tile and a tile boundary, and a filtering method.

As described above, filtering may not be performed implicitly on a non-continuous tile boundary, or filtering may be performed implicitly on a continuous tile boundary. Filtering may be performed on a boundary of a picture within a tile by using a reconstructed pixel positioned at a boundary of a continuous surface in a 3D space before projecting to a 2D form, and by using encoded/decoded information. For the same, the image encoding apparatus may signal a boundary at which position of which tile is used for filtering through a header, and the image decoding apparatus may determine whether or not to perform filtering on a picture boundary within an arbitrary tile, and a boundary at which position of which tile on which filtering is performed by using transmitted information.

Alternatively, a method of projecting and rearranging a 360 image may be transmitted through a header so that the image encoding/decoding apparatus may determine implicitly whether or not to perform filtering on a picture boundary within each tile, and a boundary at which position of which tile on which filtering is performed. Herein, a filter may include, in addition to a deblocking filter, loop filters such as adaptive sample offset, adaptive loop filter which perform filtering by using a pixel reconstructed on or beyond a boundary, and encoded/decoded information.

Figure 18:
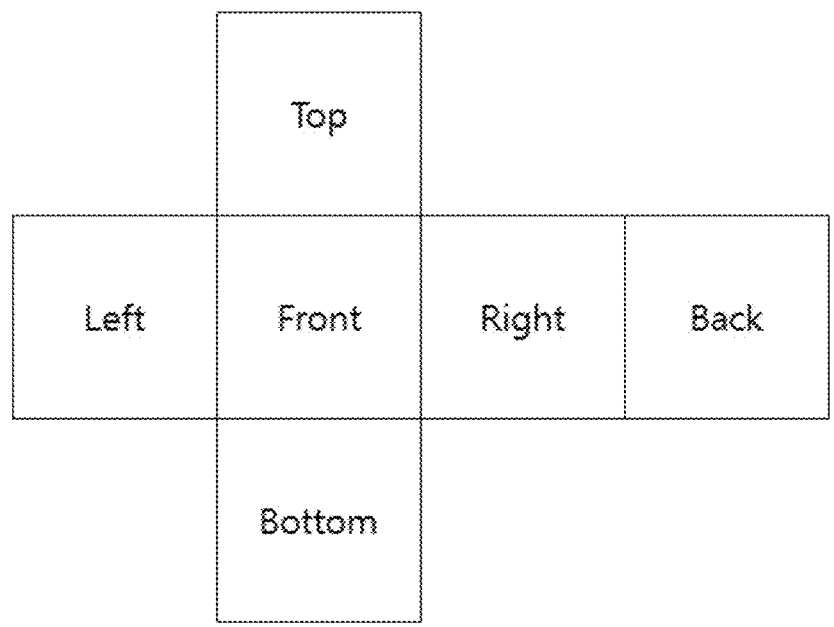
FIG. 18 is a view showing a configuration example where a 360 image is represented in six surfaces (Left, Front, Right, Back, Bottom, and Top) by projecting in a cubemap form.

FIG. 18 is a view showing a configuration example where a 360 image is represented in six surfaces (Left, Front, Right, Back, Bottom, and Top) by projecting in a Cubemap form.

The encoder/decoder may receive and output in a rectangle form, and thus compression may be performed on six surfaces by rearranging the surfaces into a rectangular form without margins.

Figure 19:
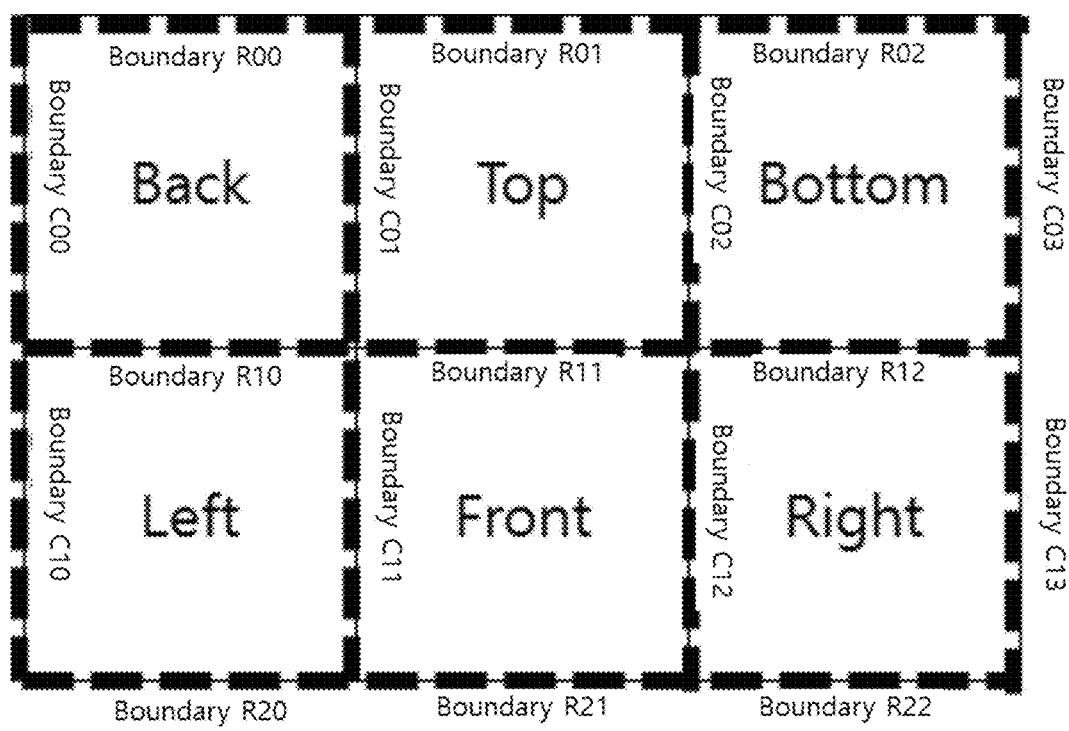
FIGS. 19 and 20 is views respectively showing an example where six surfaces obtained by projecting in a cubemap form are rearranged.
Figure 20:
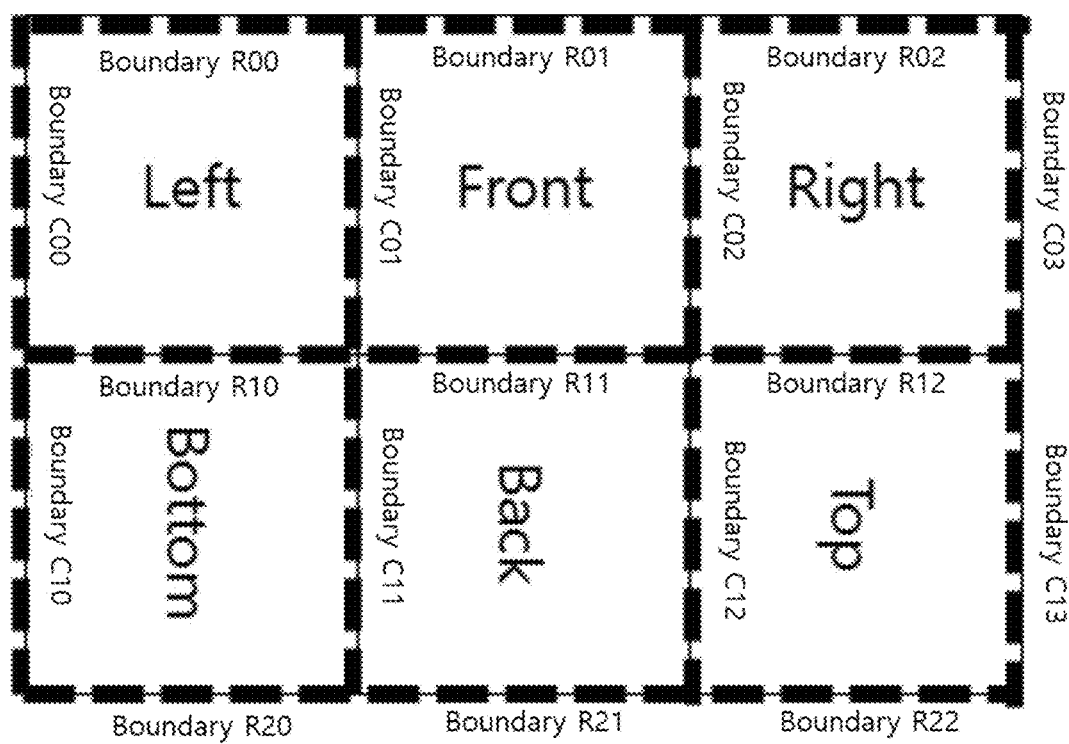

FIGS. 19 and 20 is views respectively showing an example where six surfaces obtained by projecting in a cubemap form are rearranged. FIG. 19 shows rearrangement using CMP (cubemap projection), and FIG. 20 shows rearrangement using RSP (rotated sphere projection).

In FIG. 19, Left and Front, Front and Right, and Top and Front are surfaces spatially continuous in a 3D space, respectively. However, the other surfaces are not spatially continuous. When respective surfaces are encoded/decoded in respective tiles, boundaries C11, C12, and R11 are tile boundaries and continuous boundaries, and boundaries R10, R12, C01, and C02 are tile boundaries and spatially non-continuous boundaries. Accordingly, performing filtering on the boundary C11, C12, and R11 can remove blocking artifacts or improve image quality. On the contrary, it is preferable in terms of image quality not to perform filtering on boundaries R10, R12, C01, and C02 as they are non-continuous boundaries. In addition, boundaries (C00 and C13), and (R00 and R01) are picture boundaries, and are continuous boundaries with each other, and thus filtering may be performed so as to improve image quality by assuming the they are adjacent boundaries with each other.

In FIG. 20, Top, Back, and Bottom are rotated 90 degrees to the right, and thus boundaries R10, R11, and R12 are non-continuous boundaries, and remaining boundaries are spatially continuous. Accordingly, boundaries R10, R11, and R12 are non-continuous boundaries, and thus it is preferable in terms of image quality not to perform filtering. In addition, boundaries (C00 and R11), and (R00 and R12), etc. are picture boundaries and continuous boundaries with each other, and thus filtering may be performed so as to improve image quality by assuming that they are adjacent boundaries with each other.

In a method of projecting and rearranging shown FIG. 20, the encoder may entropy encode information on projection and rearrangement method, whether or not to perform filtering on a right or left boundary of a tile, and a method thereof through a header, and the decoder may derive whether or not to perform filtering on a right or left boundary within an arbitrary tile by using entropy decoded information, and may not implicitly perform filtering on a top and a bottom within the tile. In addition, the encoder may entropy encode information on projection and rearrangement method, and whether or not to perform filtering on picture boundaries, and the decoder may implicitly determine a boundary of at which position of which tile is to be used for performing filtering, and perform filtering on a picture boundary within each tile.

FIG. 21 shows an example of defining a syntax and a semantic for transmitting whether or not to perform filtering on each boundary and a method thereof through a picture parameter set.

The encoder may signal whether or not to perform filtering on a picture of each tile, and a tile boundary, and a method thereof through syntax loop_filter_across_tile_col [i][j] and loop_filter_across_tile_row[i][j] which are defined below.

In addition, loop_filter_across_tile_upper_boundary[i], and loop_filter_across_tile_left_boundary[i] are syntaxes representing which boundary of which tile filtering is performed for a picture boundary of each tile.

In case of not being a 360 image, filtering on a picture boundary is not necessary, and thus loop_filter_across_tile_col[i][0] and loop_filter_across_tile_row[i][0], loop_filter_across_tile_upper_boundary[i], and loop_filter_across_tile_left_boundary[i] may not be signaled, and "not performing filtering" may be implicitly derived in the encoder/decoder.

In addition, whether or not to perform filtering on a tile boundary, and a method thereof may be transmitted in units of CTU or in units of predefined size (herein, the predefined size may be a value identically fixed in the encoder and the decoder, or may be signaled through a sequence parameter set, a picture parameter set, an adaptation parameter set, a slice header, a tile header, a brick header, etc.).

For the same, the encoder, first, may entropy encode a flag bit representing that filtering is performed or not identically on boundaries of all block units included in a tile boundary through a sequence parameter set, a picture parameter set, an adaptation parameter set, a slice header, a tile header, a brick header, etc. In addition, when performing filtering, the encoder may additionally transmit flag bits of a number of CTs positioned in a tile boundary (or the number—1), or a number of predefined size blocks (or the number—1), and may entropy encode whether or not to perform filtering on a tile boundary positioned at each block or a method thereof. The decoder may entropy decode the flag bit, and may identically perform tile boundary filtering on all boundaries within a tile to be decoded, or determine whether or not to perform filtering on a tile boundary in units of CTU positioned at a tile boundary or in units of predetermined block, and a method thereof.

By using the embodiment of the present inventions, performing unnecessary filtering on a boundary where blocking artifacts is not present can be prevented, and blocking artifacts due to at least one of prediction, transform, and quantization can be removed.

Figure 22:
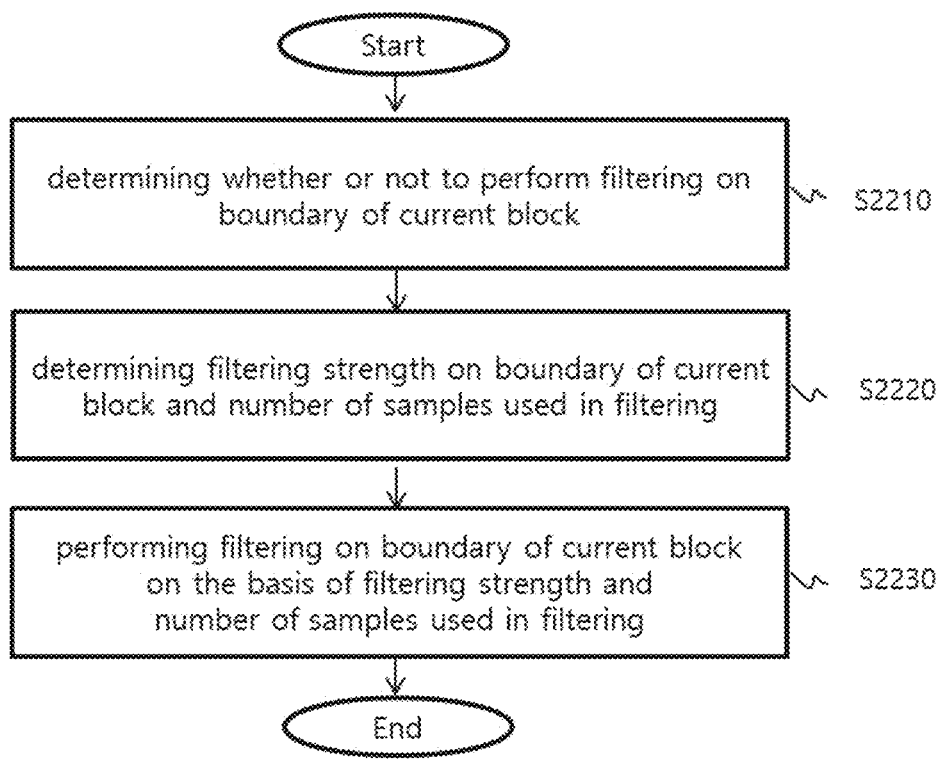
FIG. 22 is a view of a flowchart showing a method of decoding an image according to an embodiment of the present invention image.

FIG. 22 is a view of a flowchart showing a method of decoding an image according to an embodiment of the present invention image.

Referring to FIG. 22, in S2201, the image decoding apparatus may determine whether or not to perform filtering on a boundary of a current block.

In detail, determining whether or not to perform filtering may be performed on the basis of whether or not the boundary of the current block matches with at least one of a picture boundary, a subpicture boundary, a slice boundary, a tile boundary, and a brick boundary.

Subsequently, in S2202, the image decoding apparatus may determine a filtering strength on the boundary of the current block and a number of samples used in filtering.

Herein, the number of samples used in filtering may be determined on the basis of at least one of a size of the current block and a size of a neighboring block adjacent to the boundary of the current block. In detail, when the boundary of the current block is a vertical boundary, the number of samples used in filtering may be determined on the basis of at least one of a width of the current block and a width of the neighboring block. In addition, when the boundary of the current block is a horizontal boundary, the number of samples used in filtering may be determined on the basis of at least one of a height of the current block and a height of the neighboring block.

In addition, the number of samples used in filtering may be determined by comparing at least one of a size of the current block and a size of the neighboring block with a predefined value.

In an example, the predefined value used for comparing with the size of the current block and the size of the neighboring block may be 32.

Meanwhile, the number of samples used in filtering may be independently determined according to a luma component and a chroma component of the current block.

Meanwhile, the filtering strength may be determined on the basis of a prediction mode of the neighboring block and a prediction mode of the current block.

In an example, the filtering strength may be determined as a weak filtering strength when the prediction mode of the neighboring block and the prediction mode of the current block are different from each other. Herein, the weak filtering strength may be BS=1.

Subsequently, in S2203, the image decoding apparatus may perform filtering on the boundary of the current block on the basis of the filtering strength and the number of samples used in filtering.

An image decoding method of the present invention has been described with reference to FIG. 22. An image encoding method of the present invention may be performed as described with reference to FIG. 22.

Meanwhile, the present invention may include a non-transitory computer readable recording medium storing image data used for an image decoding method of the present invention. Herein, the image data may be a bitstream.

The image data may include information on whether or not to perform filtering, and a coding parameter. In an image decoding method, information on whether or not to perform filtering may be used when determining whether or not to perform filtering on a boundary of a current block.

In the present invention, a boundary of a current block may mean a boundary of a current block and/or neighboring block.

In the present invention, a neighboring block may mean a block adjacent to a boundary of the current block.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in an apparatus for encoding/decoding an image.

The invention claimed is:

1. A method of decoding an image, the method comprising:
    determining whether or not to perform filtering on a boundary of a current block based on a type of the boundary;
    determining a filtering strength on the boundary of the current block, and a number of samples used in filtering; and
    performing filtering on the boundary of the current block based on the filtering strength and the number of samples used in filtering,
    wherein filtering is not performed in a case that the boundary of the current block is a vertical boundary and a left boundary of the current block matches with a picture boundary of a picture comprising the current block,
    the number of samples used as inputs of a filter to perform filtering on a target pixel is determined based on a width of the current block when the boundary of the current block is the vertical boundary,
    a type of the filter is determined based on whether a width of the current block is less than 8, and
    a 7-tap filter is used for the filtering when the boundary of the current block is the vertical boundary and the width of the current block is equal to or greater than 32.

2. The method of claim 1, wherein the number of samples used as the inputs of the filter to perform filtering on the target pixel is determined based on a width of the neighboring block when the boundary of the current block is a vertical boundary.

3. The method of claim 1, wherein the number of samples used as inputs of a filter to perform filtering on a target pixel is determined based on a height of the current block and a height of the neighboring block when the boundary of the current block is a horizontal boundary.

4. The method of claim 1, wherein the determining of whether or not to perform filtering is performed by whether or not the boundary of the current block matches with at least one of the picture boundary, a slice boundary, and a brick boundary.

5. The method of claim 1, wherein the filtering strength is determined based on whether a prediction mode of the neighboring block and a prediction mode of the current block is the same or not.

6. The method of claim 1, wherein the filtering strength is a weak filtering strength in a case that intra prediction using one of intra prediction modes is used for the neighboring block and inter prediction is used for the current block,
    a prediction block of the neighboring block is derived based on at least one first reference pixel adjacent to an upper side of the neighboring block and at one second reference pixel adjacent to a left side of the neighboring block as the intra prediction is used for the neighboring block, and
    the intra prediction modes comprise a DC mode and a Planar mode.

7. The method of claim 1, wherein the number of samples used in filtering is independently determined according to a luma component and a chroma component of the current block.

8. A method of encoding an image, the method comprising:
    determining whether or not to perform filtering on a boundary of a current block based on a type of the boundary;
    determining a filtering strength on the boundary of the current block, and a number of samples used in filtering; and
    performing filtering on the boundary of the current block based on the filtering strength and the number of samples used in filtering,
    wherein filtering is not performed in a case that the boundary of the current block is a vertical boundary and a left boundary of the current block matches with a picture boundary of a picture comprising the current block,
    the number of samples used as inputs of a filter to perform filtering on a target pixel is determined based on a width of the current block when the boundary of the current block is the vertical boundary,
    a type of the filter is determined based on whether a width of the current block is less than 8, and
    a 7-tap filter is used for the filtering when the boundary of the current block is the vertical boundary and the width of the current block is equal to or greater than 32.

9. The method of claim 8, wherein the number of samples used as the inputs of the filter to perform filtering on the target pixel is determined based on and a width of the neighboring block when the boundary of the current block is a vertical boundary.

10. The method of claim 8, wherein the number of samples used as inputs of a filter to perform filtering on a target pixel is determined based on a height of the current block and a height of the neighboring block when the boundary of the current block is a horizontal boundary.

11. The method of claim 8, wherein the determining of whether or not to perform filtering is performed by whether or not the boundary of the current block matches with at least one of the picture boundary, a slice boundary, and a brick boundary.

12. The method of claim 8, wherein the filtering strength is determined based on whether a prediction mode of the neighboring block and a prediction mode of the current block is the same or not.

13. The method of claim 8, wherein the filtering strength is a weak filtering strength in a case that intra prediction using one of intra prediction modes is used for the neighboring block and inter prediction is used for the current block,
- a prediction block of the neighboring block is derived based on at least one first reference pixel adjacent to an upper side of the neighboring block and at one second reference pixel adjacent to a left side of the neighboring block as the intra prediction is used for the neighboring block, and
- the intra prediction modes comprise a DC mode and a Planar mode.

14. The method of claim 8, wherein the number of samples used in the filtering is independently determined according to a luma component and a chroma component of the current block.

15. A non-transitory computer readable storage medium storing a bitstream, the bitstream comprising:
- information about filtering on a boundary of a current block, wherein
- the information and a type of the boundary are used for determining whether or not to perform filtering on the boundary of the current block,
- a filtering strength on the boundary of the current block and a number of samples used in filtering are determined,
- filtering on the boundary of the current block is performed based on the filtering strength and the number of samples used in filtering,
- filtering is not performed in a case that the boundary of the current block is a vertical boundary and a left boundary of the current block matches with a picture boundary of a picture comprising the current block,
- the number of samples used as inputs of a filter to perform filtering on a target pixel is determined based on a width of the current block when the boundary of the current block is the vertical boundary,
- a type of the filter is determined based on whether a width of the current block is less than 8, and
- a 7-tap filter is used for the filtering when the boundary of the current block is the vertical boundary and the width of the current block is equal to or greater than 32.

16. The method of claim 1, wherein the target pixel is a pixel adjacent to the vertical boundary.

17. The method of claim 6, wherein the filtering strength is a weak filtering strength in a case that an Intra Block Copy (IBC) mode is used for the current block, and
- the filtering strength is a strong filtering strength in a case that Combined Intra Inter Prediction (CIIP) mode is used for the current block.

* * * * *